United States Patent
Cariou et al.

(10) Patent No.: US 10,582,537 B2
(45) Date of Patent: Mar. 3, 2020

(54) ACCESS POINT (AP), STATION (STA) AND METHOD OF CHANNEL ACCESS FOR SPATIAL REUSE

(71) Applicant: Intel IP Corporation, Santa Clara, CA (US)

(72) Inventors: Laurent Cariou, Portland, OR (US); Carlos Cordeiro, Portland, OR (US); Ou Yang, Santa Clara, CA (US); Solomon B. Trainin, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 478 days.

(21) Appl. No.: 15/375,338

(22) Filed: Dec. 12, 2016

(65) Prior Publication Data

US 2017/0303314 A1 Oct. 19, 2017

Related U.S. Application Data

(60) Provisional application No. 62/323,332, filed on Apr. 15, 2016, provisional application No. 62/323,412, filed on Apr. 15, 2016.

(51) Int. Cl.
*H04W 4/00* (2018.01)
*H04W 74/08* (2009.01)

(52) U.S. Cl.
CPC .............................. *H04W 74/0808* (2013.01)

(58) Field of Classification Search
USPC ........ 370/329, 252, 338, 216, 230, 328, 330
See application file for complete search history.

(56) References Cited

U.S. PATENT DOCUMENTS

| 2008/0039046 | A1* | 2/2008 | Vilzmann | H04W 74/0825 455/296 |
| 2008/0056297 | A1* | 3/2008 | Gaur | H04W 74/0816 370/447 |
| 2008/0112370 | A1* | 5/2008 | Kwon | H04W 28/20 370/336 |
| 2010/0135319 | A1* | 6/2010 | Wang | H04W 74/0875 370/445 |

* cited by examiner

*Primary Examiner* — Phuongchau Ba Nguyen
(74) *Attorney, Agent, or Firm* — Schwegman Lundberg & Woessner, P.A.

(57) ABSTRACT

Embodiments of an access point (AP), station (STA) and method for channel access are generally described herein. The AP may contend for access to a channel. The contention may be performed in accordance with an omni-directional enhanced distributed channel access function (EDCAF) for transmission within an omni-directional pattern. The contention may be further performed in accordance with a directional EDCAF for transmission to a station (STA) in a directional pattern. The AP may determine whether to transmit within the omni-directional pattern based at least partly on an omni-directional backoff parameter. The AP may further determine whether to transmit in the directional pattern based at least partly on a directional backoff parameter.

13 Claims, 17 Drawing Sheets

US 10,582,537 B2

ACCESS POINT (AP), STATION (STA) AND METHOD OF CHANNEL ACCESS FOR SPATIAL REUSE

PRIORITY CLAIM

This application claims priority under 35 USC 119(e) to U.S. Provisional Patent Application Ser. No. 62/323,412, filed Apr. 15, 2016 and U.S. Provisional Patent Application Ser. No. 62/323,332, filed Apr. 15, 2016, both of which are incorporated herein by reference in their entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi communications. Some embodiments relate to channel access. Some embodiments relate to spatial reuse. Some embodiments relate to channel access in accordance with omni-directional and/or directional patterns.

BACKGROUND

Wireless communications have been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
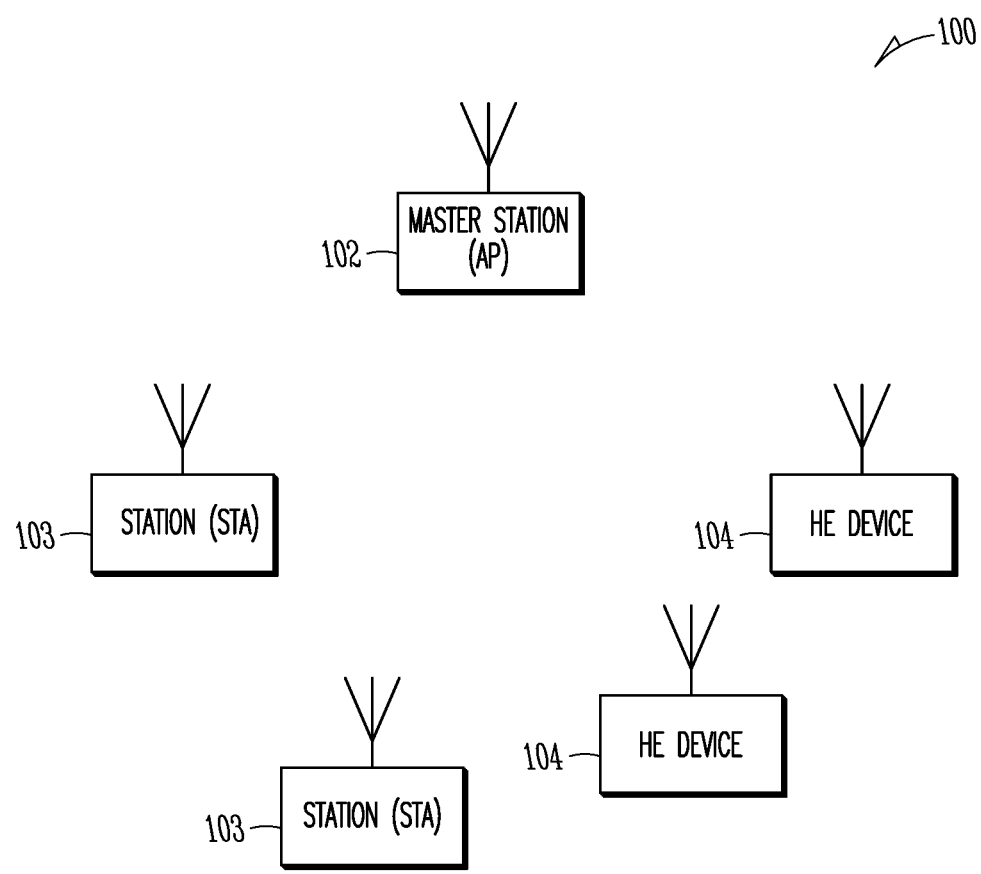
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non HE devices in some cases, and a combination of HE devices and non HE devices in some cases. Accordingly, it is understood that although techniques described herein may refer to either a non HE device or to an HE device, such techniques may be applicable to both non HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE stations 104 in accordance with one or more of the IEEE 802.11 standards, including 802.11ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HE control period, the master station 102 may communicate with HE stations 104 using one or more HE PPDUs. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station 102 and/or HE stations 104 may generate an HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
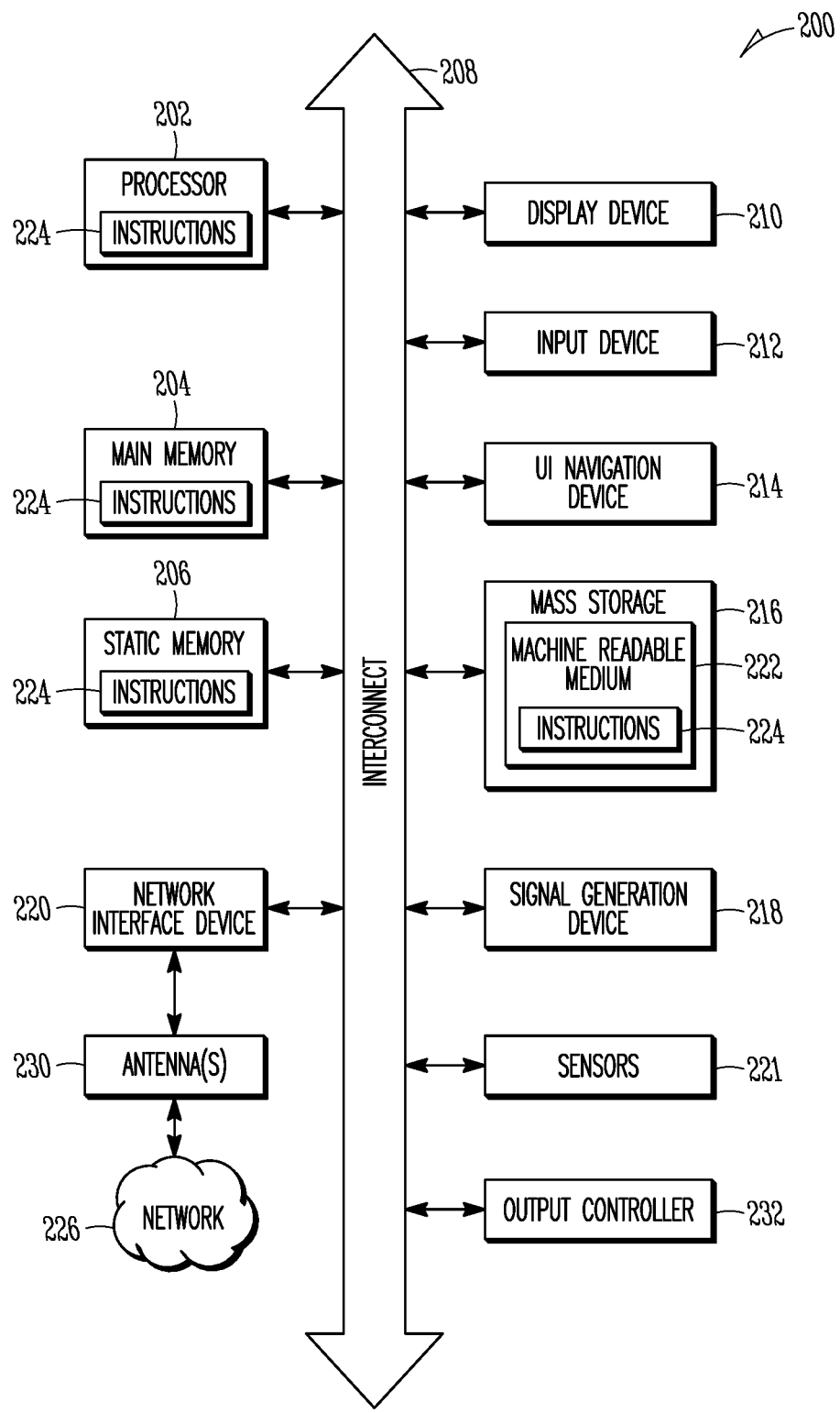
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
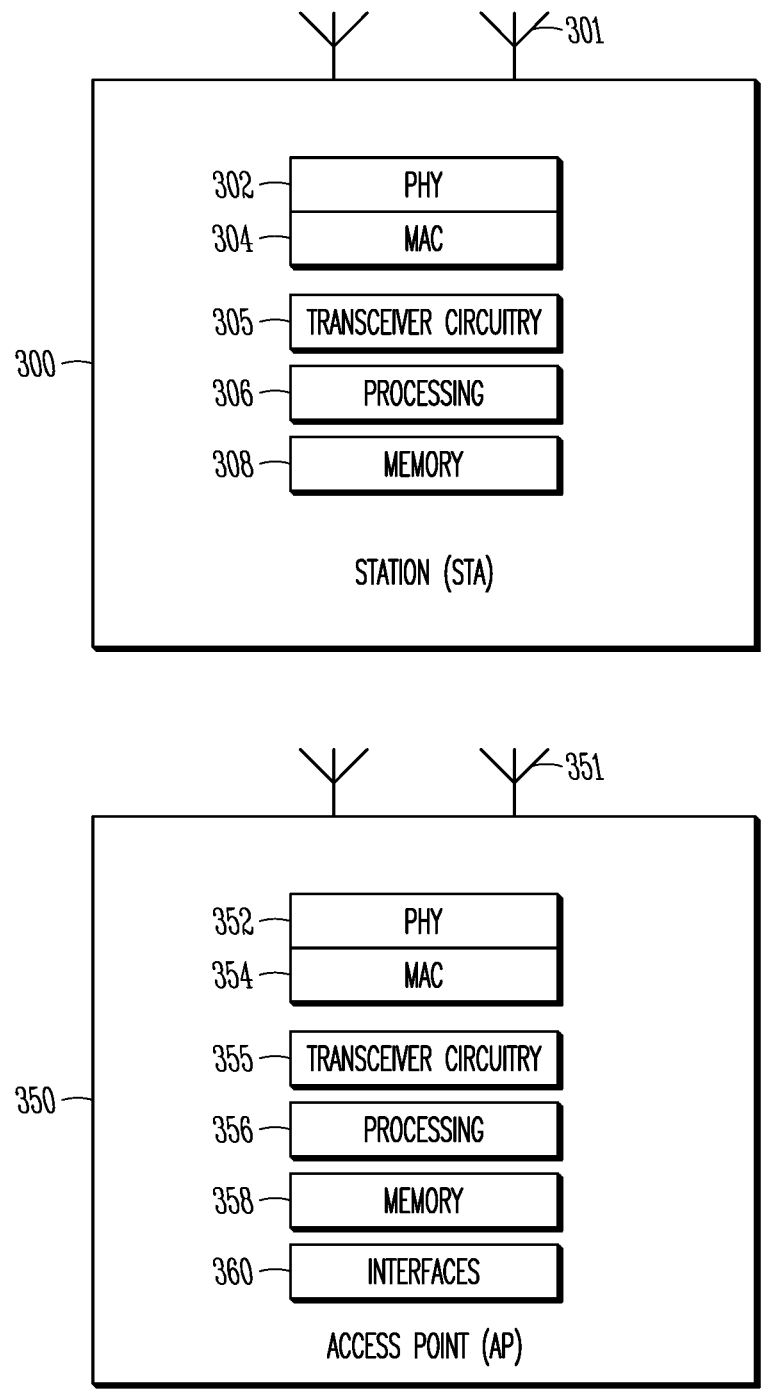
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in any of FIG. 2, FIG. 3 (as in 300) and/or FIGS. 4-7. The STA 300 may be suitable for use as an STA 103 as depicted in FIG. 1, in some embodiments. It should also be noted that in some embodiments, an AP or other base station may include some or all of the components shown in any of FIG. 2, FIG. 3 (as in 350) and/or FIGS. 4-7. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by an STA may include various components of the STA 300 as shown in FIG. 3 and/or the example machine 200 as shown in FIG. 2 and/or components shown in FIGS.

4-7. Accordingly, techniques and operations described herein that refer to the STA 300 (or 103) may be applicable to an apparatus for an STA, in some embodiments. It should also be noted that in some embodiments, an apparatus used by an AP may include various components of the AP 350 as shown in FIG. 3 and/or the example machine 200 as shown in FIG. 2 and/or components shown in FIGS. 4-7. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

Figure 4:
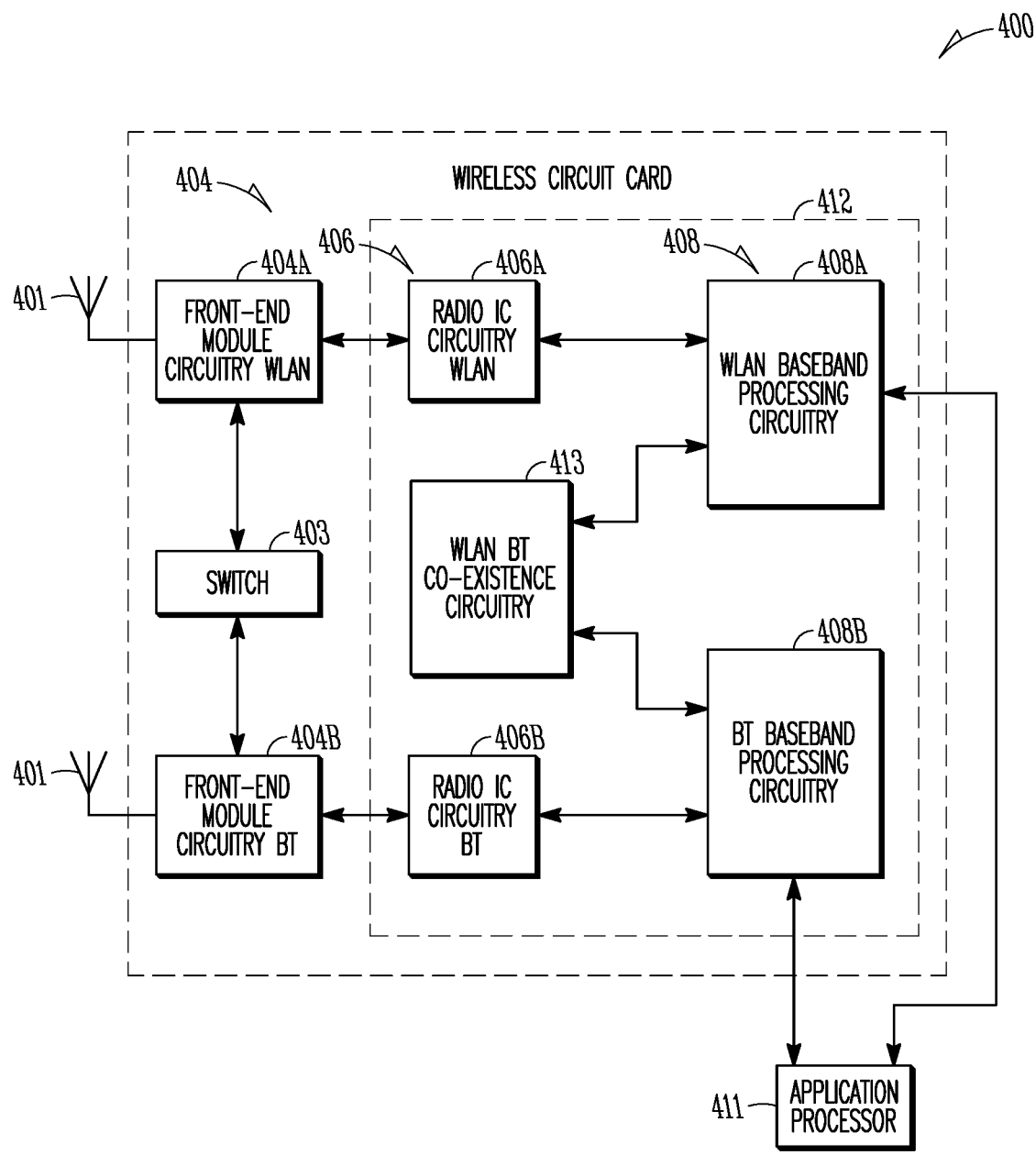
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 404 may include a WLAN or Wi-Fi FEM circuitry 404a and a Bluetooth (BT) FEM circuitry 404b. The WLAN FEM circuitry 404a may include a receive signal path comprising circuitry configured to operate on WLAN RF signals received from one or more antennas 401, to amplify the received signals and to provide the amplified versions of the received signals to the WLAN radio IC circuitry 406a for further processing. The BT FEM circuitry 404b may include a receive signal path which may include circuitry configured to operate on BT RF signals received from one or more antennas 402, to amplify the received signals and to provide the amplified versions of the received signals to the BT radio IC circuitry 406b for further processing. FEM circuitry 404a may also include a transmit signal path which may include circuitry configured to amplify WLAN signals provided by the radio IC circuitry 406a for wireless transmission by one or more of the antennas 401. In addition, FEM circuitry 404b may also include a transmit signal path which may include circuitry configured to amplify BT signals provided by the radio IC circuitry 406b for wireless transmission by the one or more antennas. In the embodiment of FIG. 4, although FEM 404a and FEM 404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406a and BT radio IC circuitry 406b. The WLAN radio IC circuitry 406a may include a receive signal path which may include circuitry to down-convert WLAN RF signals received from the FEM circuitry 404a and provide baseband signals to WLAN baseband processing circuitry 408a. BT radio IC circuitry 406b may in turn include a receive signal path which may include circuitry to down-convert BT RF signals received from the FEM circuitry 404b and provide baseband signals to BT baseband processing circuitry 408b. WLAN radio IC circuitry 406a may also include a transmit signal path which may include circuitry to up-convert WLAN baseband signals provided by the WLAN baseband processing circuitry 408a and provide WLAN RF output signals to the FEM circuitry 404a for subsequent wireless transmission by the one or more antennas 401. BT radio IC circuitry 406b may also include a transmit signal path which may include circuitry to up-convert BT baseband signals provided by the BT baseband processing circuitry 408b and provide BT RF output signals to the FEM circuitry 404b for subsequent wireless transmission by the one or more antennas 401. In the embodiment of FIG. 4, although radio IC circuitries 406a and 406b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 408 may include a WLAN baseband processing circuitry 408a and a BT baseband processing circuitry 408b. The WLAN baseband processing circuitry 408a may include a memory, such as, for example, a set of RAM arrays in a Fast Fourier Transform or Inverse Fast Fourier Transform block (not shown) of the WLAN baseband processing circuitry 408a. Each of the WLAN baseband circuitry 408a and the BT baseband circuitry 408b may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408a and 408b may further include physical layer (PHY) and medium access control layer (MAC) circuitry, and may further interface with application processor 410 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408a and the BT baseband circuitry 408b to enable use cases requiring WLAN and BT coexistence. In addition, a switch 403 may be provided between the WLAN FEM circuitry 404a and the BT FEM circuitry 404b to allow switching between the WLAN and BT radios according to application needs. In addition, although the antennas 401 are depicted as being respectively connected to the WLAN FEM circuitry 404a and the BT FEM circuitry 404b, embodiments include within their scope the sharing of one or more antennas as between the WLAN and BT FEMs, or the provision of more than one antenna connected to each of FEM 404a or 404b.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 5:
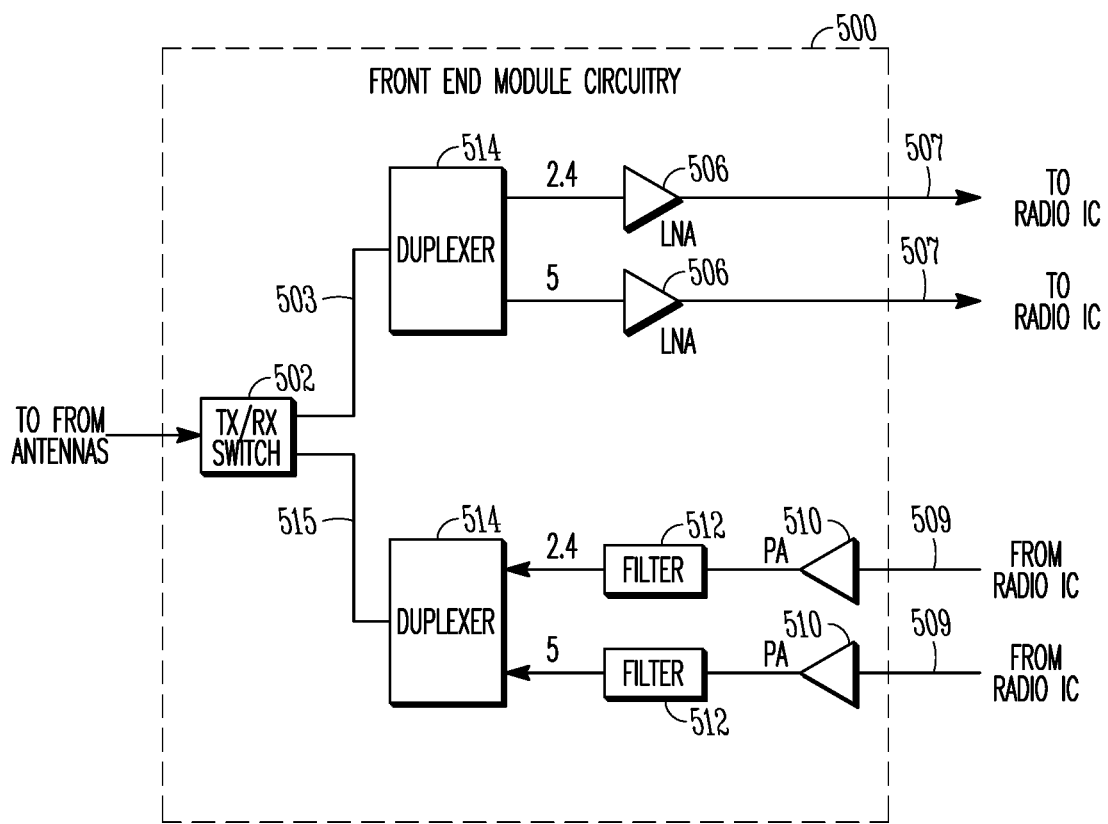
FIG. 5 illustrates a front-end module circuitry for use in the radio architecture of FIG. 4 in accordance with some embodiments.

FIG. 5 illustrates FEM circuitry 500 in accordance with some embodiments. The FEM circuitry 500 is one example of circuitry that may be suitable for use as the WLAN and/or BT FEM circuitry 404a/404b (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

Figure 6:
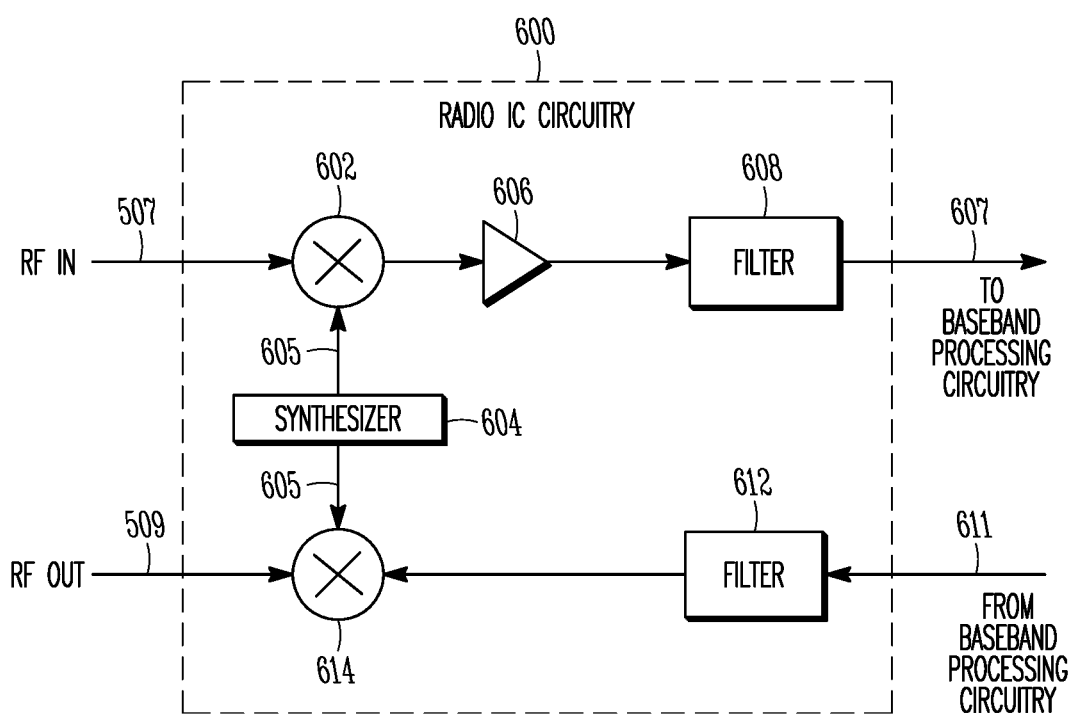
FIG. 6 illustrates a radio IC circuitry for use in the radio architecture of FIG. 4 in accordance with some embodiments.

FIG. 6 illustrates radio IC circuitry 600 in accordance with some embodiments. The radio IC circuitry 600 is one example of circuitry that may be suitable for use as the WLAN or BT radio IC circuitry 406a/406b (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 620 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 604 may be provided by a voltage controlled oscillator (VCO), although that is not a requirement. A divider control input may further be provided by either the baseband processing circuitry 408 (FIG. 4) or the application processor 410 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 410.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency ($f_{LO}$).

Figure 7:
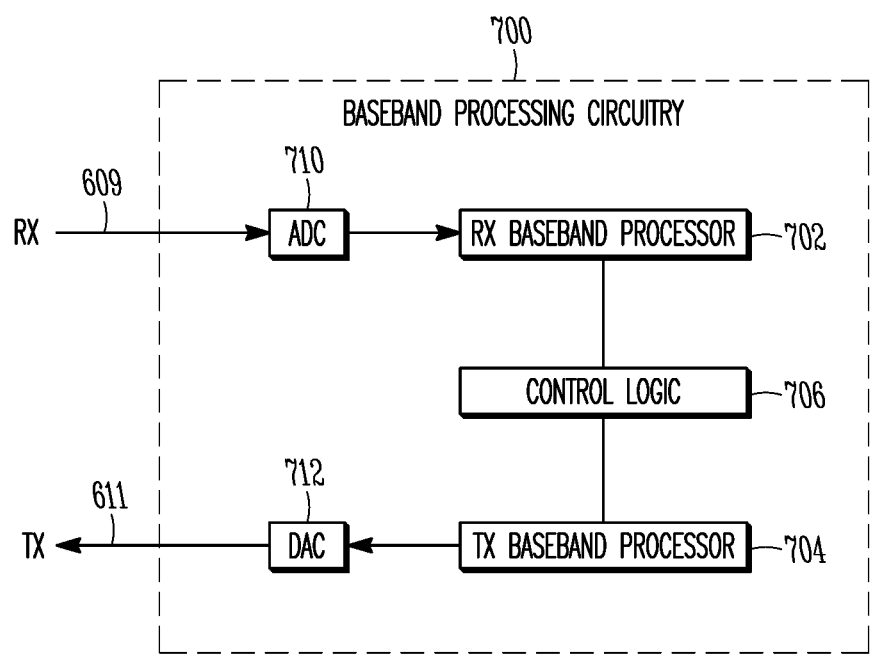
FIG. 7 illustrates a baseband processing circuitry for use in the radio architecture of FIG. 4 in accordance with some embodiments.

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408*a*, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In accordance with some embodiments, the AP 102 may contend for access to a channel. The contention may be performed in accordance with an omni-directional enhanced distributed channel access function (EDCAF) for transmission within an omni-directional pattern. The contention may be further performed in accordance with a directional EDCAF for transmission to an STA 103 in a directional pattern. The AP 102 may determine whether to transmit within the omni-directional pattern based at least partly on an omni-directional backoff parameter. The AP 102 may further determine whether to transmit in the directional pattern based at least partly on a directional backoff parameter. These embodiments will be described in more detail below.

Figure 8:
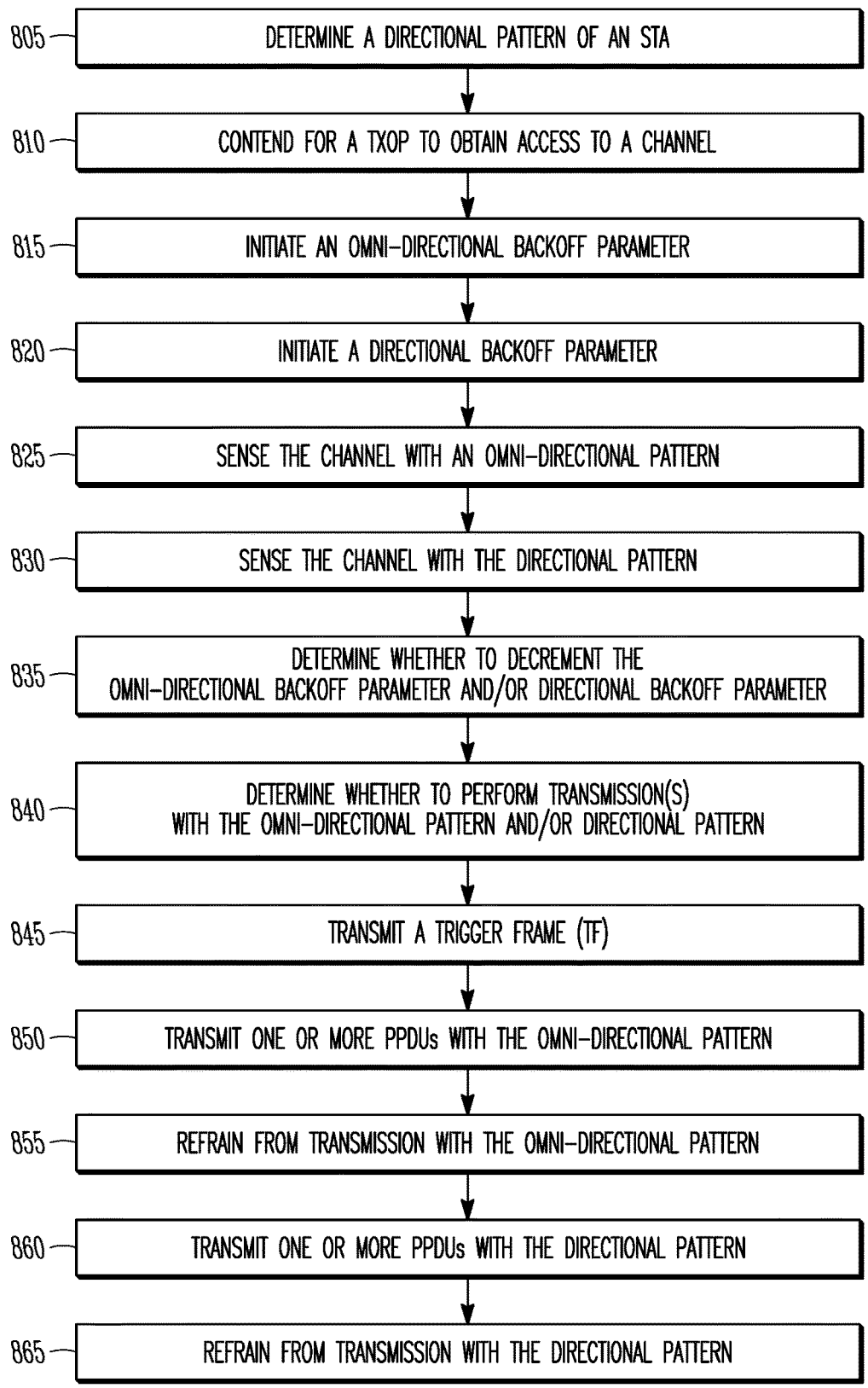
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-17, although it is understood that the method 800 may be practiced with any other suitable systems, interfaces and components.

In some embodiments, the AP 102 and/or STA 103 may be configurable to operate as an HE device 104. Although reference may be made to an AP 102 and/or STA 103 herein, including as part of the descriptions of the method 800 and/or other methods described herein, it is understood that an HE device 104, an AP 102 configurable to operate as an HE device 104 and/or STA 103 configurable to operate as an HE device 104 may be used in some embodiments. In addition, the method 800 and other methods described herein may be applicable to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 800 and other methods described herein may be practiced by other mobile devices, such as an Evolved Node-B (eNB) or User Equipment (UE). The method 800 and other methods described herein may also be practiced by wireless devices configured to operate in other suitable types of wireless communication systems, including systems configured to operate according to various Third Generation Partnership Project (3GPP) Long Term Evolution (LTE) standards. The method 800 may also be applicable to an apparatus for an STA 103, HE device 104 and/or AP 102 or other device described above, in some embodiments.

It should also be noted that embodiments are not limited by references herein (such as in descriptions of the methods 800, 1200, 1500 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In addition, although the method 800 may be described in terms of operations performed by an AP 102, such descriptions are not limiting. The method 800 may be practiced by an STA 103 and/or other device, in some embodiments.

At operation 805 of the method 800, the AP 102 may determine a directional pattern of an STA 103. In a non-limiting example, the AP 102 may use an omni-directional pattern to sense a channel, and may receive signal(s) from one or more STAs 103. In some embodiments, the AP 102 may determine an antenna weight vector (AWV) of the STA 103 based at least partly on a beamforming training in accordance with the omni-directional pattern. The AWV may be used for transmission in the directional pattern, in some embodiments.

In some embodiments (such as embodiments of the method 800 and/or other methods described herein), the apparatus may comprise an omni-directional antenna or may be coupled to an omni-directional antenna for the transmission within the omni-directional pattern. The apparatus may further comprise a directional antenna or may be coupled to a directional antenna for the transmission in the directional pattern. The AWV may be determined for usage by the directional antenna. In some embodiments, a single antenna may be used for omni-directional and/or directional transmission(s). In some embodiments, the memory may be configurable to store the AWV of the STA 103.

In some embodiments (such as embodiments of the method 800 and/or other methods described herein), the AP 102 may sense the channel with the omni-directional pattern based on a signal received in accordance with the omni-directional pattern.

At operation 810, the AP 102 may contend for a transmission opportunity (TXOP) to obtain access to a channel. In some embodiments, the AP 102 may contend for a TXOP during which the AP 102 is to control access to the channel. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. The AP 102 may transmit and/or receive one or more frames and/or signals during the period. However, it should be noted that embodiments are not limited to scheduled transmission/reception or to transmission/reception in accordance with the exclusive control of the medium. Accordingly, an MPDU, PPDU, BA frame and/or other frame may be transmitted/received in contention-based scenarios and/or other scenarios, in some embodiments. Any suitable contention methods, operations and/or techniques may be used, which may or may not be part of a standard. In a non-limiting example, one or more contention methods, operations and/or techniques of an 802.11 standard/protocol and/or W-LAN standard/protocol may be used.

Various techniques may be used for the contention. In some embodiments, the contention may be performed in accordance with an omni-directional enhanced distributed channel access function (EDCAF) for transmission within an omni-directional pattern. The contention may be further performed in accordance with a directional EDCAF for transmission to the STA 103 in the directional pattern. In some embodiments, the AP 102 may contend for access to the channel for concurrent transmission within the omni-directional pattern and in the directional pattern. Accordingly, usage of the two EDCAFs (and/or others) may enable concurrent transmission by the AP 102 to multiple STAs 103 (in an omni-directional pattern, directional pattern(s) or a combination thereof).

It should be noted that operations, techniques and/or concepts described herein may use a single STA 103, but embodiments are not limited to a single STA 103. Some or all of the operations, techniques and/or concepts described herein may be extended to cases of multiple STAs 103.

It should be noted that one or more operations described herein may be performed as part of an EDCAF, but embodiments are not limited to usage of the EDCAF. Accordingly, one or more operations described herein may be performed, but may not necessarily be performed as part of an EDCAF. For instance, initiation of a backoff, channel sensing, monitoring the backoff and/or other operations may or may not be performed as part of an EDCAF.

At operation 815, an omni-directional backoff parameter may be initiated. At operation 820, a directional backoff parameter may be initiated. At operation 825, the AP 102 may sense the channel with the omni-directional pattern. At operation 830, the AP 102 may sense the channel with the directional pattern. At operation 835, the AP 102 may determine whether to decrement the omni-directional backoff parameter and/or directional backoff parameter. At operation 840, the AP 102 may determine whether to perform transmission(s) with the omni-directional pattern and/or directional pattern. At operation 845, the AP 102 may transmit a trigger frame (TF). At operation 850, the AP 102 may transmit one or more PPDUs with the omni-directional pattern. At operation 855, the AP 102 may refrain from transmission with the omni-directional pattern. At operation 860, the AP 102 may transmit one or more PPDUs with the directional pattern. At operation 865, the AP 102 may refrain from transmission with the directional pattern. One or more of operations 815-865 (and/or others in some cases) may be performed. Various example arrangements will be described in more detail below.

In some embodiments, the AP 102 may initiate the omni-directional backoff parameter for the omni-directional EDCAF; initiate a directional backoff parameter for the directional EDCAF; sense the channel with the omni-directional pattern and with the directional pattern to determine whether to decrement the omni-directional backoff parameter and the directional backoff parameter; determine whether to transmit within the omni-directional pattern based at least partly on the omni-directional backoff parameter; and determine whether to transmit in the directional pattern based at least partly on the directional backoff parameter.

In some embodiments, during a sensing period, the AP 102 may sense the channel with the omni-directional pattern. When channel inactivity is sensed with the omni-directional pattern, the AP 102 may decrement the omni-directional backoff parameter and may decrement the directional backoff parameter. In addition, when channel activity is sensed with the omni-directional pattern, the AP 102 may refrain from decrement of the omni-directional backoff parameter; may sense the channel with the directional pattern; may decrement the directional backoff parameter when channel inactivity is sensed with the directional pattern; and/or may refrain from decrement of the directional backoff parameter when channel activity is sensed with the directional pattern. In some cases, if the directional backoff parameter is decremented to zero during the sensing period, the AP 102 may encode a physical layer converge procedure (PLCP) protocol data unit (PPDU) for transmission in the directional pattern during a transmission opportunity (TXOP). The TXOP may include a time window subsequent to the sensing period. The TXOP may be accessible to the AP 102 for transmission based at least partly on the decrement of the directional backoff parameter to zero during the sensing period. In some cases, if the omni-directional backoff parameter is decremented to zero during the sensing period, the AP 102 may encode another PPDU for transmission to another STA 103 within the omni-directional pattern during the TXOP. In some cases, if the omni-directional backoff parameter is not decremented to zero during the sensing period, the AP 102 may restrict transmission in at least a portion of the omni-directional pattern that is exclusive to the directional pattern. For instance, the AP 102 may transmit in the directional pattern if the directional backoff parameter decrements to zero during the sensing period, but may refrain from (and/or restrict) transmissions in other directions included within the omni-directional pattern.

In some embodiments, if the directional backoff parameter is decremented to zero during the sensing period or if the omni-directional backoff parameter is decremented to zero during the sensing period, the AP 102 may transmit a PPDU in the directional pattern. For instance, the AP 102 may use either criterion to determine whether to transmit in the directional pattern. In a non-limiting example, the directional backoff parameter may be initialized to a higher value than the omni-directional backoff parameter. Accordingly, the omni-directional backoff parameter may decrement to zero before the directional backoff parameter, and the AP 102 may transmit in the directional pattern in this case.

Any suitable channel sensing techniques and/or measurements may be used. Non-limiting examples of such will be presented below. In some embodiments, the AP 102 may detect a signal power as part of the channel sensing with the omni-directional pattern. The channel inactivity or channel activity with the omni-directional pattern may be determined based at least partly on a comparison between the signal power and a predetermined threshold.

In some cases, when the channel activity is sensed with the omni-directional pattern, the AP 102 may detect a second signal power as part of the channel sensing with the directional pattern. The AP 102 may sense the channel inactivity or channel activity with the directional pattern based at least partly on a comparison between the second signal power and a second predetermined threshold. Embodiments are not limited to performance of the channel sensing with the directional pattern in the case when the channel activity is sensed with the omni-directional pattern. Accordingly, the channel sensing with the directional pattern may be performed in a case when the channel inactivity is sensed with the omni-directional pattern and/or in other cases, in some embodiments.

In some embodiments, as part of the channel sensing with the omni-directional pattern, the AP 102 may attempt to detect a ready-to-send (RTS) frame or a clear-to-send (CTS) frame with the omni-directional pattern. The AP 102 may sense the channel inactivity or channel activity with the omni-directional pattern based at least partly on the attempted detection of the RTS frame or CTS frame with the omni-directional pattern. In addition, the attempted detection of the RTS frame or CTS frame with the omni-directional pattern may include attempted detection with the omni-directional pattern of one or more receiver training (R-TRN) fields of the RTS frame or CTS frame, in some embodiments.

In some embodiments, as part of the channel sensing with the directional pattern, the AP 102 may attempt to detect an RTS frame or a CTS frame with the directional pattern. The AP 102 may sense the channel inactivity or channel activity with the directional pattern based at least partly on the attempted detection of the RTS frame or CTS frame with the directional pattern. In addition, the attempted detection of the RTS frame or CTS frame with the directional pattern may include attempted detection with the directional pattern of one or more R-TRN fields of the RTS frame or CTS frame.

In some embodiments, the AP 102 may determine whether channel activity is present during a sensing period based on channel sensing with an omni-directional pattern. When channel activity is determined as absent during the sensing period, the AP 102 may decrement an omni-directional backoff parameter for an omni-directional contention and may decrement one or more directional backoff parameters for one or more directional contentions for one or more candidate transmit directions. When channel activity is determined as present during the sensing period, the AP 102 may refrain from decrement of the omni-directional backoff parameter; and may determine whether to decrement the directional backoff parameters based on directional channel sensing in the candidate transmit directions. In some embodiments, the AP 102 may decrement the directional backoff parameters for which directional channel inactivity is determined as part of the directional channel sensing. The AP 102 may refrain from decrement of the directional backoff parameters for which directional channel activity is determined as part of the directional channel sensing.

The AP 102 may determine that access to the channel for a transmission opportunity (TXOP) has been obtained by the AP 102 when the omni-directional backoff parameter or at least one of the directional backoff parameters is decremented to zero during the sensing period. In a non-limiting example, when the omni-directional backoff parameter is decremented to zero during the sensing period, access to the channel for the TXOP may be obtained by the AP 102 for omni-directional transmission or for directional transmission in any of the candidate transmit directions. When at least one of the directional backoff parameters is decremented to zero during the sensing period, access to the channel for the TXOP may be obtained by the AP 102 for one or more directional transmissions in the candidate transmit directions for which the directional backoff parameters are decremented to zero during the sensing period.

In some embodiments, measurements of the channel sensing may be based on one or more of a signal quality measurement, a signal power measurement, a signal-to-noise ratio (SNR), received signal strength indicator (RSSI), decoding success/failure (such as for RTS, CTS and/or other) and/or other. For instance, training symbols of a packet, frame, RTS, CTS and/or other may be used for such purpose, in some cases.

In some embodiments, the PPDU(s) may be transmitted in one or more signals of any suitable format. As a non-limiting example, the downlink signal may be transmitted in channel resources that include multiple sub-carriers of a predetermined sub-carrier bandwidth. The signal(s) may be an orthogonal frequency division multiplexing (OFDM) signal or an orthogonal frequency division multiple access (OFDMA) signal. Modulation symbols of the signal(s) may be mapped to the sub-carriers for the OFDM signal or OFDMA signal. It should be noted that embodiments are not limited to OFDM signals or to OFDMA signals. As an example, single-carrier frequency division multiplexing (SC-FDM) signals may be used. As another example, modulation symbols of the signal(s) may be multiplexed in time. The signal(s) may be based on multiple modulation symbols, which may be encoded by one or more transmitter functions, including but not limited to FEC encoding, interleaving, scrambling and/or bit-to-symbol mapping.

In some embodiments, the AP 102 may transmit a trigger frame (TF). In a non-limiting example, the TF may indicate information to be used by the STA 103 to exchange one or more frames and/or signals (such as the PPDUs) with the AP 102 during a transmission opportunity (TXOP). Example information of the TF may include, but is not limited to, time resources to be used for transmission and/or reception, channel resources to be used for transmission and/or reception, identifiers of STAs 103 that are to transmit, identifiers of STAs 103 that are to receive and/or other information. It should be noted, however, that embodiments are not limited to usage of the TF, and some embodiments may not necessarily include the usage of the TF.

Figure 9:
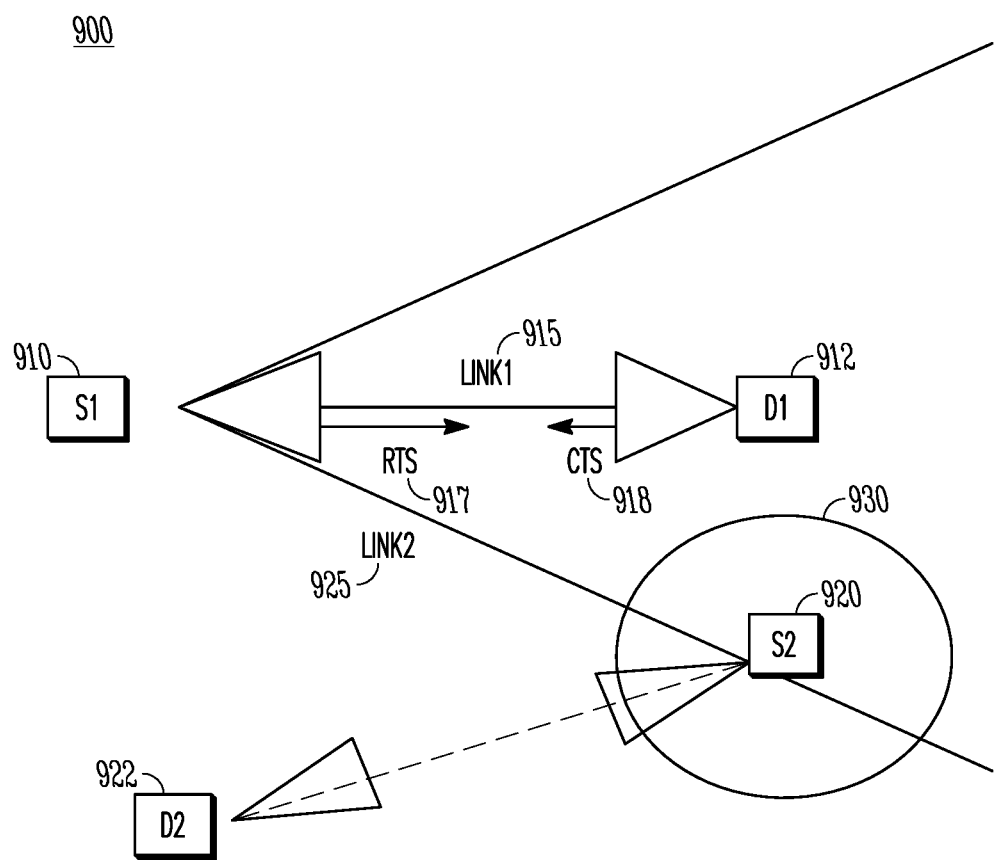
FIG. 9 illustrates an example channel access scenario in accordance with some embodiments.
Figure 10:
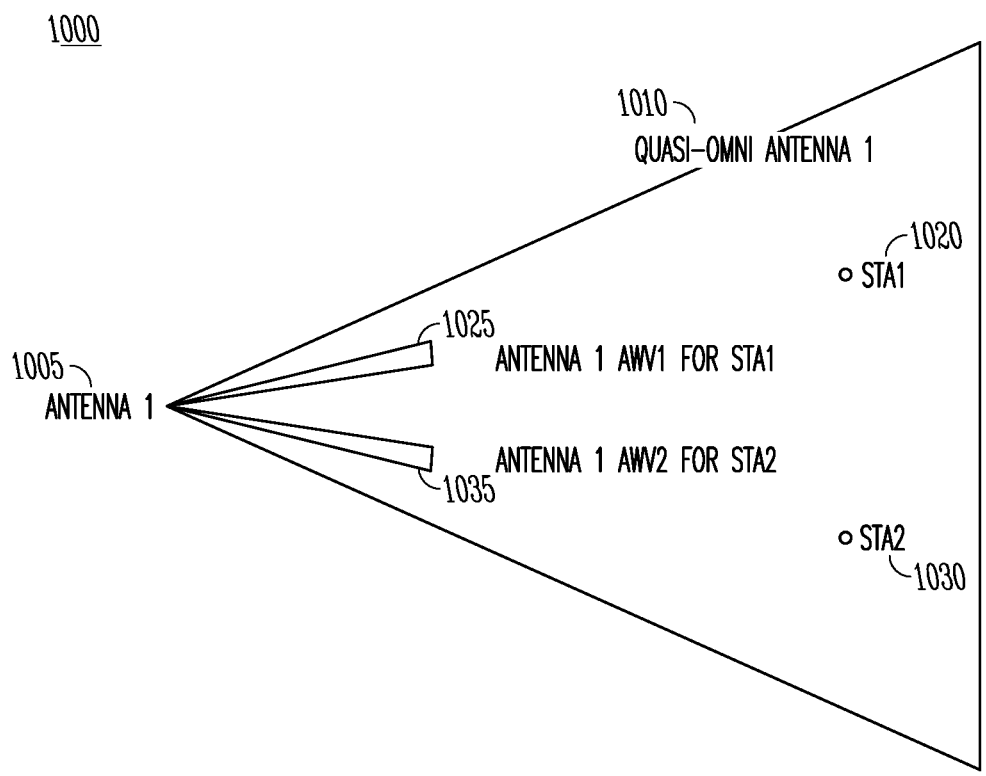
FIG. 10 illustrates example antenna patterns in accordance with some embodiments.
Figure 11:
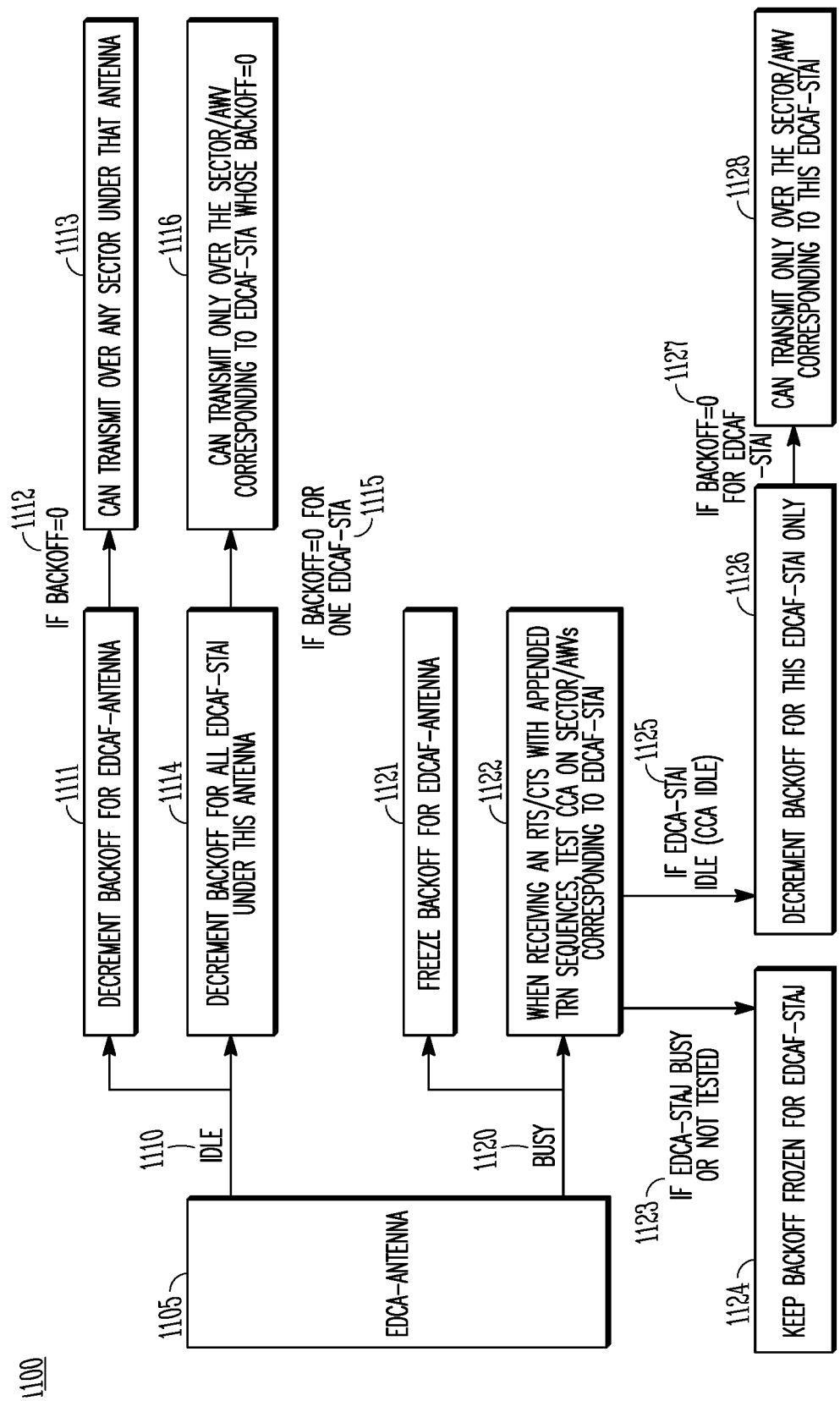
FIG. 11 illustrates example operations in accordance with some embodiments.

FIG. 9 illustrates an example channel access scenario in accordance with some embodiments. FIG. 10 illustrates example antenna patterns in accordance with some embodiments. FIG. 11 illustrates example operations in accordance with some embodiments. It should be noted that the examples shown in FIGS. 9-11 may illustrate some or all of the concepts and techniques described herein in some cases, but embodiments are not limited by the examples of FIGS. 9-11. For instance, embodiments are not limited by the name, number, type, size, ordering, arrangement and/or other aspects of the frames, signals, fields, data blocks, operations, time resources, channels, frequency bands, and other elements as shown in FIGS. 9-11. Although some of the elements shown in the examples of FIGS. 9-11 may be included in an 802.11 standard and/or other standard, embodiments are not limited to usage of such elements that are included in standards.

Referring to FIG. 9, in the example scenario 900, a first link 915 may be used by STAs S1 and D1 (labeled as 910 and 912) for communication. The STA S1 (910) may transmit a request to send (RTS) message 917 and the STA D1 (912) may transmit a clear to send (CTS) message The RTS 917 and CTS 918 may be included in an 802.11 standard and/or other standard, in some embodiments, and may be used for purposes such as mitigation of hidden node issues or other purpose. The scope of embodiments is not limited to the RTS 917 and CTS 918, however, as any suitable messages may be used, including messages not necessarily included in a standard.

In the example scenario 900, the STA S2 (labeled as 920) may intend to use the second link 925 to communicate with the STA D2 (labeled as 922). The STA S2 (920) may listen for an RTS of other STAs. The listening may be performed with an omni-directional antenna pattern in some cases, as indicated by the circle 930, although the scope of embodiments is not limited in this respect. In this case, the STA S2 (920) may detect the RTS 917 of the communication between the STAs S1 and D1 (910 and 912). In some embodiments, although the RTS 917 has been detected, the STA S2 (920) may use a beamforming technique to perform a transmission in a directional manner toward the STA D2 (922). It may be possible that this directional transmission does not create interference (or such interference is acceptable and/or tolerable) to the first link 915. However, if the STA S2 (920) senses the channel (such as listening for the RTS 917) in an omni-directional receive mode, the STA S2 (920) may detect the RTS 917 from STA S1 (910). Accordingly, the STA S2 (920) may perform one or more operations such as set its clear channel assessment (CCA) to a busy state, set its network allocation vector (NAV), refrain from the transmission to the STA D2 (922) on the second link 925 and/or other, in some cases. In some embodiments, the STA S2 (920) may detect and/or listen for an RTS, CTS or both, and may perform operations based on the detection of either or both of the RTS or CTS.

In some embodiments, the STA S1 (910) and the STA D1 (912) may exchange RTS and CTS messages before PPDU transmission (and/or other packet(s)). The STA S1 (910) and the STA D1 (912) may append a number of receiver training fields (TRN-R) at the end of the RTS and CTS frames. The TRN-R training fields may enable other devices (such as STA S2 (920) or other) that intend to access the channel (and that have received the RTS or the CTS or both using an omni-receiver mode) to check different Rx sectors to perform operations such as determination of clear channel access (CCA), determination of whether to transmit and/or other operation(s). In some cases, if the CCA is idle in a specific Rx sector, the STA S2 (920) may access the channel using the corresponding Tx sector (pointing in the same direction because of reciprocity). The STA S2 (920) may ignore the NAV set by the first 915, in some cases.

In some embodiments, an enhanced distribution channel access function (EDCAF) may be used by an STA 103 that may transmit to more than one destination STA 103. In a non-limiting example, an EDCAF may manage a single back-off decrement per antenna, or per RF-BB chain (in case one RF-BaseBand chain is connected to multiple antennas), based on CCA and NAV associated to this RF-BB/antenna and applied to the angles (such as quasi-omni angles or other) covered by this RF-BB/antenna. In some embodiments, a granularity for CCA and NAV may be per sector within an antenna, which means that the CCA and NAV may be idle and zero in specific sectors of an antenna, while the CCA and NAV of the RF-BB/antenna itself (applied on the quasi-omni angle of the antenna) may be busy and non-zero. In this situation, the EDCAF back-offs from all AC queues may be decremented for specific sectors, but not for the entire RF-BB/antenna.

In some embodiments, multiple enhanced distribution channel access (EDCA) counters and functions per antenna may be used. This may provide greater flexibility than a case in which single EDCA counter and function per antenna are used. In some embodiments, EDCAF per RF-BB/antenna may be used. In addition, EDCAF per destination STA 103 per sector/AWV for directional transmissions may be used in some cases. In some embodiments, for each RF-BB/antenna, an EDCAF with a back-off counter that corresponds to quasi-omni angle of the antenna(s). The EDCAF may be referred to as an "EDCAF-RF-BB/antenna" herein. In addition, multiple EDCAFs with specific back-off counters may be used. The EDCAFs may correspond to limited sectors or AWVs of the antenna(s). The EDCAF in such cases may be referred to herein as an "EDCAF-sector" or "EDCAF-AWV" or "EDCAF-STA" or "EDCAF-STA-AWV." Embodiments and examples described herein may be related to how the back-offs may be decremented and relationship(s) between the back-offs of a particular antenna, and operations (and/or rules, procedures or other) of transmission when the channel is gained by a particular EDCAF.

In some embodiments, per-STA spatial reuse may be performed. For instance, such per-STA spatial reuse may be performed by devices transmitting to multiple STAs, although the scope of embodiments is not limited in this respect. In some embodiments, multiple CCA/EDCAF per sector and antenna may be used.

Referring to FIG. 10, the example scenario 1000 illustrates a pattern of an antenna (connected to one RF-BB) of an AP 102 with its quasi-omni angles and its sectorized angles (sector or AWV). It should be noted that the antenna pattern shown may be used to illustrate some of the concepts, techniques, operations and/or methods described herein, but embodiments are not limited to the antenna pattern shown.

It should be noted that in some or all of the descriptions herein, reference may be made to scenarios in which the AP 102 operates as a transmitter, but it is understood that, in some cases, a STA 103 may also operate as a transmitter and/or perform one or more transmission operations. In some embodiments, an antenna per RF-BB may be used, although the scope of embodiments is not limited in this respect. Multiple antennas may be connected to one RF-BB, in some embodiments. In addition, in some embodiments, one RF-BB per AP 102 and/or STA 103 may be used. The scope of embodiments is not limited in this respect, however, as multiple RF-BBs per STA 103 may also be used, in some embodiments.

In some embodiments, for each RF-BB/antenna, an EDCAF with a backoff counter may defined, which may corresponds to quasi-omni angle of the antenna (this may be referred to herein as an "EDCAF-antenna" or "EDCAF-RF-BB"). In addition, for each RF-BB/antenna, multiple EDCAF with specific back-off counters may be defined, which may correspond to limited sectors or AWVs of this antenna (this may be referred to herein as an "EDCAF-sector" or "EDCAF-AWV" or "EDCAF-STA").

In some embodiments, an EDCAF for a particular antenna (such as the EDCAF-antenna or EDCAF-RF-BB) may be used when the AP 102 intends to transmit with the particular antenna. In addition, when the AP 102 has performed beamforming training with a particular STA 103, it may have determined a particular sector or AWV (such as best or preferred) to use when transmitting to this particular STA 103. When this is done, the AP 102 may create a new EDCAF-STA corresponding to this particular AWV for this particular STA. It should be noted that the EDCAF-STA may be created either for the particular STA 103 or for a specific sector/AWV. Accordingly, an EDCAF may be created for each of multiple STAs 103 in this sector/AWV. It should also be noted that, in some cases, the AP 102 may also have multiple EDCAF-STA for a particular STA 103 if it has multiple best AWVs/sectors to reach that particular STA 103.

In some embodiments, the AP 102 may operate, for each of its antennas, with an EDCAF-antenna (or EDCAF-RF-BB) and may further operate with one or more EDCAF-STAs. In a non-limiting example, consider that the AP 102 has one EDCAF-antenna (or EDCAF-RF-BB) and two EDCAF-STAs (for STA1 and STA2). When traffic arrives in the queue for STA1 served by this antenna with a particular access class (AC), the EDCAF-antenna may generate a new back-off for this AC. The EDCAF-STA1 may also generate a new back-off for this AC. The EDCAF-antenna (or EDCAF-RF-BB) may decrement its back-off based on the CCA and NAV information obtained via quasi-omni reception on antenna 1. In the reception, any suitable frames/messages/blocks may be received, including but not limited to data PPDUs, RTS, CTS, DTS and/or other. In some cases, the EDCAF-STA1 may decrement its back-off based on the CCA and NAV information obtained via the quasi-omni reception on antennal, but may ignore the CCA and NAV as a result of checking AWV-CCA.

Non-limiting example cases are described below. In a non-limiting example, the AP 102 may receive an RTS or a CTS that triggers CCA busy (and possibly NAV setting) on CCA-antennal-quasi-omni, but the training fields appended at the end of RTS or CTS enable the AP 102 to test the CCA for AWV1 corresponding to STA1, and this CCA-AWV1 is idle. The AP 102 may therefore ignore the NAV and may resume back-off decrement on it for EDCAF-AWV1 after a specific time.

In another non-limiting example, if the CCA-AWV cannot be tested (and/or is not tested for any suitable reason), the EDCAF-AWV may follow the NAV and CCA from the quasi-omni and may therefore behave in a same or similar manner to the EDCAF-antenna. In this example, if the EDCAF-antenna detects another transmission in addition to the one that enabled resuming the back-off decrement from EDCAF-AWV1, before the AP 102 starts transmitting with AWV1, all EDCAF (antenna and AWV1) may freeze again until and if the CCA can be checked on AWV1 or others.

In another non-limiting example, if EDCA-antenna continues receiving data and/or ACK during the TxOP initiated by RTS/CTS with TRN from a pair of STAs 103 for which TRN training has been done through RTS/CTS, the EDCA-STA of one of the STAs 103 that became idle based on RTS/CTS can continue decrementing its back-off during the entire TxOP.

One or more operations, responses, procedures, rules, guidelines and/or other may be used when the channel is gained by a particular EDCAF. The example cases that follow are not limiting or exhaustive. The example cases may also be extended to multiple STAs, sectors, antennas and/or other element(s). Recall the previous example in which one EDCAF-antenna and two EDCAF-STAs (for STA1 and STA2) are used.

In some cases, if the channel is gained based on EDCAF-antennal, the AP 102 may transmit to any STAs 103 that are in the direction of the quasi-omni antennal (such as STA1 and STA2 in the example). The AP 102 can use any sector or AWV of this antenna. It may, for instance, perform a sector sweep on some or all sectors for antenna 1 to perform beamforming training with different STAs 103.

In some cases, if the channel is gained based on EDCAF-AWV1, the AP 102 may be restricted to transmit using the AWV or sector that corresponds to this EDCAF-AWV1. In the previous example, that would be for STA1 and with AWV1. It should be noted that, in some embodiments, such EDCAF-AWV can be EDCAF-sectors (that could be a bit wider, but still less wide that the quasi-omni angle) and multiple STAs 103 could be addressed by using this sector. In these cases, beamforming training with sector sweep using different sectors than the ones associated with this EDCAF may not be possible (only AWV1 in our example). The beamforming training may only be possible for the EDCAF-antenna.

In some cases, accessing the channel with EDCAF-AWV1 may be restricted to the TxOP duration. For instance, such restriction may be performed in order not to exceed the TxOP limit (NAV) of the link that sent RTS/CTS and that enabled spatial reuse with the training sequence(s).

In some cases, if the EDCAF-AWV gained access to the channel, one or more operations, responses, procedures, rules, guidelines and/or other may be used for the other EDCAF-AWVs from the same RF-BB/antenna and the corresponding EDCAF-RF-BB. The examples that follow are not limiting or exhaustive. It may be considered that there is still only one EDCAF per transmitter per AC per RF-BB. In such cases, if any EDCAF gained access to the channel under this RF-BB and AC, all the other EDCAF back-offs may be re-generated. Or it may be considered that EDCAF per receivers (or per directions) are to be used and all back-offs may be maintained until they reach zero. Accordingly, an EDCAF reaching zero may not necessarily impact the other related EDCAF(s) to be generated. Accordingly, the EDCAF(s) that are related (from the same RF-BB) may be independent, in some cases.

Referring to FIG. 11, example operations are shown. Embodiments are not limited to the operations, ordering, arrangement and/or other aspects shown in FIG. 11 and are also not limited to the flow shown in FIG. 11. Some embodiments may not necessarily include all operations shown in FIG. 11. Some embodiments may include one or more additional operations not shown in FIG. 11. Some embodiments may include one or more operations shown in FIG. 11 and may also include one or more additional operations (including but not limited to one or more operations shown in any of FIGS. 1-17). Some embodiments may include one or more operations that are similar to, related to and/or reciprocal to one or more operations shown in FIG. 11.

At 1105, the EDCA-antenna may be examined. At 1110, if the EDCA-antenna is idle: at 1111, the antenna/STA back-off may be decremented; at 1112, if the antenna/STA back-off is zero, a transmission may be performed on any sector under that antenna (as indicated by 1113). In addition, at 1114, the EDCAF-STA (for some or all STAs) under this antenna may be decremented; if a back-off is zero for one of the EDCAF-STAs (as indicated by 1115), a transmission may be performed in the sector/AWV corresponding to the STA 103 for which the back-off is zero (as indicated by 1116). At 1120, if the EDCA-antenna is busy: at 1121, the back-off over EDCA-antenna may be frozen (not decremented); at 1122, when receiving an RTS/CTS with appended TRN sequences, the CCA on sector/AWVs corresponding to EDCAF-STAs (of different STAs) may be tested at 1122. If the EDCA-STA for a particular STA is busy or not tested (at 1123), the corresponding back-off may be frozen for that particular STA (as indicated by 1124). At 1125, if the EDCA-STA for the particular STA is idle (CCA idle), the corresponding back-off for the particular STA may be decremented at 1126; as indicated by 1127, if the back-off of the particular STA is zero, a transmission over the corresponding sector/AWV may be performed at 1128.

In some embodiments, after switching to directed CCA, the down count may continue in one of following ways. In an example, the down count may continue at the time the NAV is validated. If it is for the reception of CTS or of data following the RTS after CTS timeout, the countdown may continue from the value frozen at RTS/CTS receive. In such case, there could be some misalignment between STAs that received CTS and the STAs that started from data that follows CTS timeout. In another example, the down count may continue at the time the countdown was frozen. With this option, RTS and CTS time may be deducted from the frozen back-off count. Sync with the STAs 103 that do not see the RTS/CTS may be performed, but the sync may be problematic when the back-off remainder is shorter than the RTS/CTS time. The countdown may continue from the value frozen at RTS/CTS receive. In another example, the down count may continue at an aligned time, to the point of RTS/CTS even if the STA 103 did not get the CTS. The countdown may continue from the value frozen at RTS/CTS receive. In another example, it may be possible to define a new back-off counter with CW shorter than the regular back-off, but which is valid only during the TxOP period.

Figure 12:
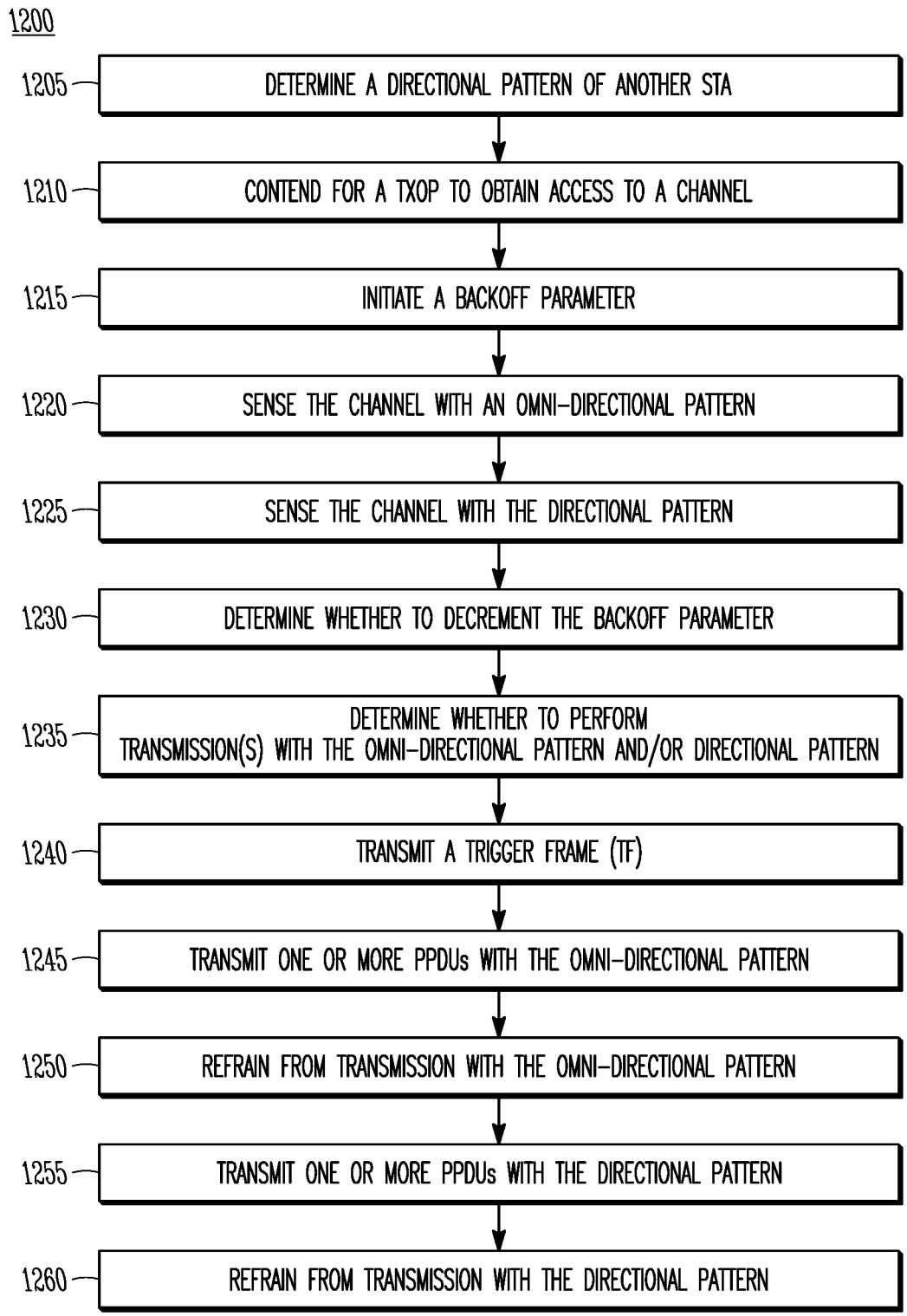
FIG. 12 illustrates the operation of another method of communication in accordance with some embodiments.

FIG. 12 illustrates the operation of another method of communication in accordance with some embodiments. As mentioned previously regarding the method 800, embodiments of the method 1200 may include additional or even fewer operations or processes in comparison to what is illustrated in FIG. 12 and embodiments of the method 1200 are not necessarily limited to the chronological order that is shown in FIG. 12. In describing the method 1200, reference may be made to FIGS. 1-11 and 13-17, although it is understood that the method 1200 may be practiced with any other suitable systems, interfaces and components.

In some embodiments, the STA 103 may be configurable to operate as an HE device 104. Although reference may be made to an STA 103 herein, including as part of the descriptions of the method 1200 and/or other methods described herein, it is understood that an HE device 104 and/or STA 103 configurable to operate as an HE device 104 may be used in some embodiments. In addition, embodiments of the method 1200 may be applicable to APs 102, STAs 103, UEs, eNBs or other wireless or mobile devices. The method 1200 may also be applicable to an apparatus for an AP 102, STA 103 and/or other device described above.

In some embodiments, one or more operations of the method 1200 may be the same as or similar to one or more operations described herein, including but not limited to one or more operations of the method 800. In addition, previous discussion of various techniques and concepts may be applicable to the method 1200 in some cases, including directional backoff parameter, directional pattern, directional EDCAF, omni-directional backoff parameter, omni-directional pattern, omni-directional EDCAF, spatial reuse, spatial multiplexing, concurrent transmission, channel contention, TXOP and/or others. In addition, one or more examples shown in any of FIGS. 1-17 may be applicable, in some cases, although the scope of embodiments is not limited in this respect.

At operation 1205, the STA 103 may determine a directional pattern of another STA 103. For instance, the STA 103 may intend to transmit data to the other STA 103. At operation 1210, the STA 103 may contend for a TXOP to obtain access to a channel. At operation 1215, the STA 103 may initiate a backoff parameter. It should be noted that a single backoff parameter may be used for contention based access for omni-directional transmission, directional transmission or a combination thereof, in some embodiments. Examples of such will be described below.

At operation 1220, the STA 103 may sense the channel with an omni-directional pattern. At operation 1225, the STA 103 may sense the channel with the directional pattern. At operation 1230, the STA 103 may determine whether to decrement the backoff parameter. AT operation 1235, the STA 103 may determine whether to perform transmission(s) with the omni-directional pattern and/or directional pattern. At operation 1240, the STA 103 may transmit a TF. At operation 1245, the STA 103 may transmit one or more PPDUs with the omni-directional pattern. At operation 1250, the STA 103 may refrain from transmission with the omni-directional pattern. At operation 1255, the STA 103 may transmit one or more PPDUs with the directional pattern. At operation 1260, the STA 103 may refrain from transmission with the directional pattern. One or more of operations 1215-1260 (and/or others in some cases) may be performed. Various example arrangements will be described in more detail below.

The STA 103 may initiate and/or generate a backoff parameter for contention based access to a channel. The STA 103 may sense the channel with an omni-directional pattern. When channel inactivity is sensed with the omni-directional pattern, the STA 103 may decrement the backoff parameter and determine whether to transmit on the channel based on the decremented backoff parameter. When channel activity is sensed with the omni-directional pattern, the STA 103 may decode a request-to-send (RTS) frame from an originating STA. The RTS frame may be included in a data transmission from the originating STA to a destination STA during a transmission opportunity (TXOP) obtained by the originating STA. The STA 103 may determine, based at least partly on durations of the TXOP and the data transmission included in the RTS frame, a remainder time of the TXOP after the data transmission. When the remainder time of the TXOP is greater than a threshold, the STA 103 may perform directional channel sensing in one or more candidate transmit directions to determine a transmit direction for a directional transmission by the STA 103 during the TXOP. The directional channel sensing may be based on directional reception of receive training (R-TRN) fields included in the RTS frame. The threshold may be based at least partly on the backoff parameter, in some embodiments.

In some embodiments, when the remainder time of the TXOP is greater than a threshold, the STA 103 may perform the following. When channel inactivity is determined as part of the directional channel sensing for a sub-group of one or more of the candidate transmit directions, the STA 103 may: decrement the backoff parameter; when the decremented backoff parameter is zero, encode one or more physical layer converge procedure (PLCP) protocol data units (PPDUs) for directional transmission in at least one of the directions of the sub-group during the TXOP after the data transmission of the originating STA; and when the decremented backoff parameter is greater than zero, perform additional omni-directional channel sensing and additional directional channel sensing in the candidate transmit directions of the sub-group to determine whether to perform directional transmissions in the transmit directions of the sub-group. In addition, when channel activity is determined for the candidate transmit directions as part of the directional channel sensing, the STA 103 may refrain from decrement of the backoff parameter.

In some embodiments, when the channel inactivity is sensed with the omni-directional pattern, the STA 103 may perform the following. When the decremented backoff parameter is zero, the STA 103 may determine that the STA 103 is to transmit in at least one of the candidate transmit directions. When the decremented backoff parameter is greater than zero, the STA 103 determine that the STA 103 is to refrain from transmission.

Figure 13:
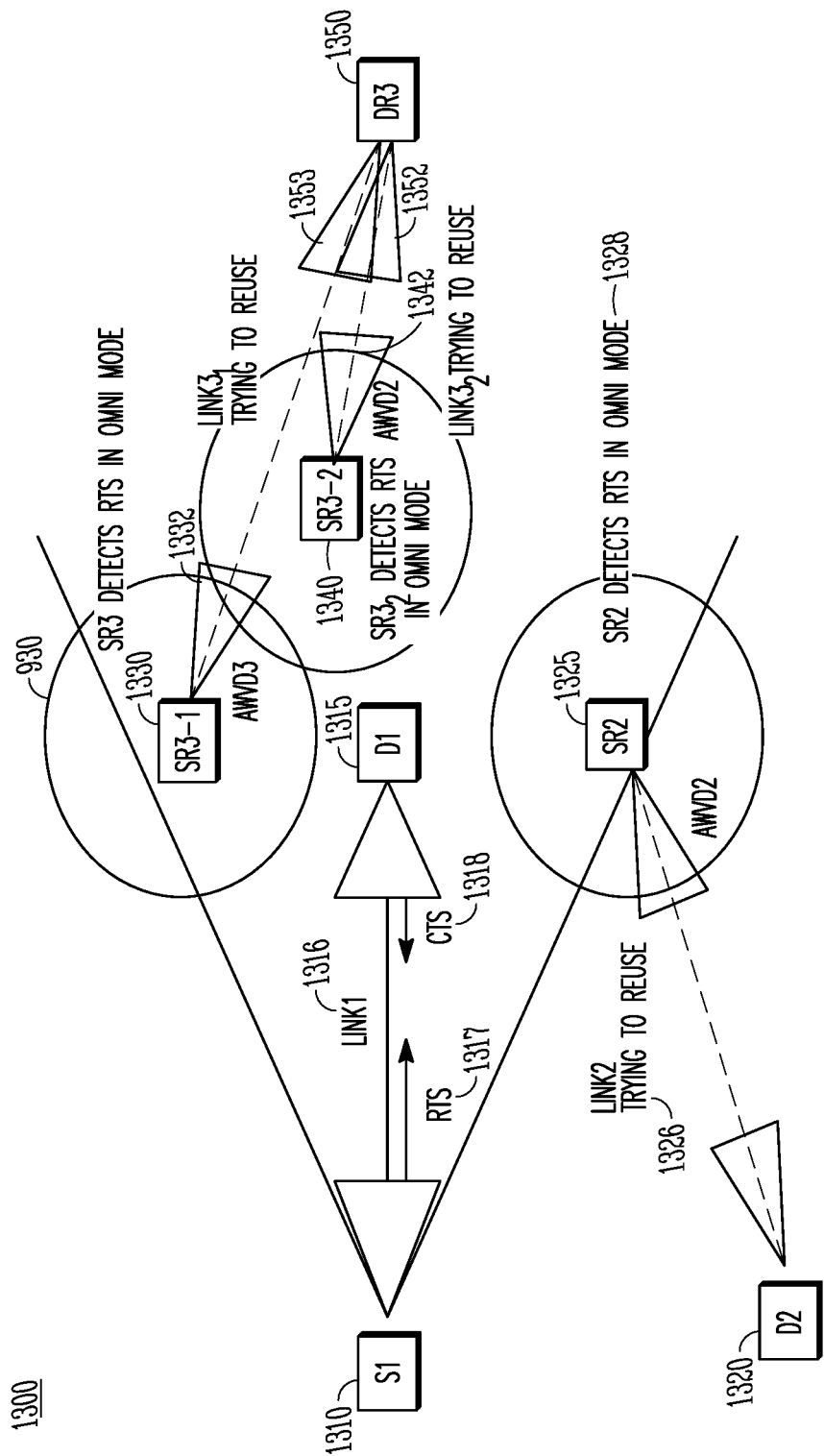
FIG. 13 illustrates additional example antenna patterns in accordance with some embodiments.
Figure 14:
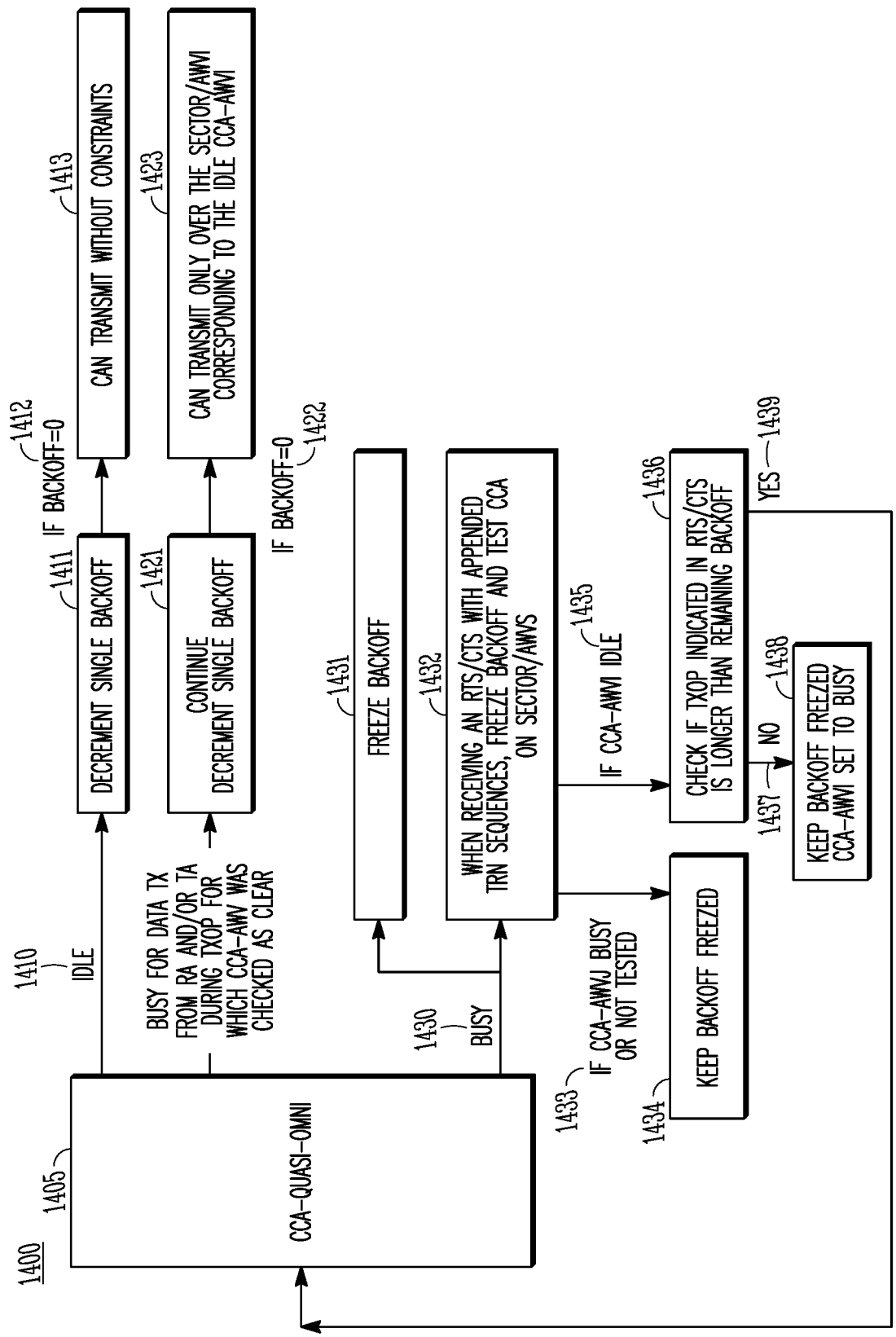
FIG. 14 illustrates additional example operations in accordance with some embodiments.

FIG. 13 illustrates additional example antenna patterns in accordance with some embodiments. FIG. 14 illustrates additional example operations in accordance with some embodiments. It should be noted that the examples shown in FIGS. 13-14 may illustrate some or all of the concepts and techniques described herein in some cases, but embodiments are not limited by the examples of FIGS. 13-14. For instance, embodiments are not limited by the name, number, type, size, ordering, arrangement and/or other aspects of the frames, signals, fields, data blocks, operations, time resources, channels, frequency bands, and other elements as shown in FIGS. 13-14. Although some of the elements shown in the examples of FIGS. 13-14 may be included in an 802.11 standard and/or other standard, embodiments are not limited to usage of such elements that are included in standards.

In some embodiments, a backoff of a single EDCAF for each RF-BB/antenna may be decremented, when spatial reuse based on training in RTS/CTS is possible, leading to different NAV and CCA values for omni-antenna or for specific sectors/AWVs. In some embodiments, the backoff may be decremented in a manner to ensure fairness between different STAs to access the channel. In some embodiments, a spatial reuse EDCAF, in addition to and/or on top of the single EDCAF for each RF-BB/antenna may be used, which is applied only when a spatial reuse period is created.

Referring to FIG. 13, in the example scenario, the link 1316 between STA S1 (1310) and STA D1 (1315) is an ongoing link. In descriptions herein, the link 1316 may be referred to as "link-1" for convenience, but it is understood that embodiments are not limited to the link 1316. The STAs 1310, 1315 may exchange RTS 1317 and CTS 1318 with TRN fields in order to enable spatial reuse. The STAs SR2 (1330), SR3-1 (1340) and SR3-2 (1350) are source STAs 103 that may attempt to exploit spatial reuse (SR) with TRN in RTS/CTS to access the channel during the TxOP set by link-1 between STA S1 (1310) and STA D1 (1315).

In some embodiments, the STA 103 may maintain a single EDCAF for the RF-BB (antenna). Referring to the example scenario 1300 in FIG. 13, the STA S1 (1310) may access the channel and may send RTS 1317, other STAs may receive the RTS 1317 using quasi-omni antenna, may set their CCA-quasi-omni to busy, may freeze their backoff it they were decrementing it and may set the NAV when detecting the duration field in the RTS 1317. As spatial reuse with training in RTS/CTS is enabled, the other STAs may perform CCA check during the training phase of RTS 1317 and/or CTS 1318 for different AWVs. In some cases, a single AWV may be used (the one in the direction of the destination STA).

For link-1, setting a TxOP with RTS/CTS with TRN fields, STAs that receive RTS/CTS exchange (or part of it) may know and/or determine information such as: the CCA for the quasi-omni antenna (busy); the CCA for the AWV they want to use (busy or idle) if they tested it with TRN field (if they didn't test it, the CCA-AWV is considered equal to CCA-quasi-omni and therefore busy); and/or other information.

In some embodiments, if the CCA for a particular AWV that the STA 103 wants to use is idle, the STA 103 may continue decrementing the single EDCAF backoff. If the channel is gained during the TxOP, and if the CCA-quasi-omni is busy and the CCA-AWV is idle: the transmission may use the particular AWV and may not transmit (and/or may be restricted from transmission) with an omni pattern, quasi-omni pattern or with other non-idle AWVs.

In some embodiments, if transmission on spatial reuse links may be performed (and/or is permitted) until the end of the TxOP of a particular link (such as link-1), one or more of the following may be used. If spatial reuse is possible during the TxOP where CCA-quasi-omni is busy and CCA-AWV is idle, and if the remaining backoff plus a minimum SR TXOP time (minimum duration of PPDU plus BA plus RTS/CTS to have useful use of the TxOP) is longer than the TxOP indicated in the RTS or CTS of the link-1, one or more operations, rules and/or procedures may be used, including but not limited to: either the STA 103 may not decrement its backoff (as if CCA is busy); the STA 103 may decrement its backoff but will not be able to transmit with quasi-omni-CCA (only with AWVs that were idle during the TxOP), even after the TxOP of link-1; the STA 103 may decrement its backoff without any constraints; and/or other.

In some embodiments, if transmission on spatial reuse links may be performed (and/or is permitted) even after the end of the TxOP of link-1, one or more of the following may be used. If spatial reuse is possible during the TxOP, and if CCA-quasi-omni is busy and CCA-AWV is idle, and if the remaining backoff is longer than the TxOP indicated in the RTS or CTS of the link-1, one or more operations, rules and/or procedures may be used, including but not limited to: either the STA 103 may not decrement its backoff (as if CCA is busy); the STA 103 may decrement its backoff but will not be able to transmit with quasi-omni-CCA (with AWVs that were idle during the TxOP), even after the TxOP of the link-1; the STA 103 may decrement its backoff (in some cases, without constraints); and/or other.

In some embodiments, if the CCA for the AWV that the STA 103 intends to use is idle, the STA 103 may continue decrementing the single EDCAF backoff in one or more cases, including but not limited to: a CTS-timeout after the end of the RTS; SIFS time after the end of the CTS if the STA 103 detected CTS; a reuse delay time after the point in time mentioned in the two previous cases; if the STA 103 considers the time at which RTS was first detected by the PHY (when CCA-quasi-omni becomes busy), or the time at which the CTS was first detected by the PHY in case the RTS was not received (when CCA-quasi-omni becomes busy). With this option, as the CCA-AWV becomes idle a time of "T" after CCA-quasi-omni became busy, the countdown may restart by reducing it by the equivalent decrement of this "T" time.

In some embodiments, when the STA 103 that received the RTS/CTS from the link-1 (such as 1316 in FIG. 13) was able to check that CCA-AWV is idle based on training fields in RTS/CTS, the STA 103 may decrement its backoff without checking CCA-AWV every timeslot for every communication that relates to this link. However, it may be desirable to ensure that the STA 103 has a relatively high chance of detecting a new link (referred to as link-2) that would transmit on top of link-1. If this happens, the STA 103 may stop decrementing backoff before being able to check CCA-AWV is idle also for this link-2.

In some embodiments, the STA 103 may monitor the medium using a quasi-omni antenna pattern, in order to see if other links access the channel on top of link-1, which would freeze decrementing backoff until CCA-AWV can be checked as idle again. While the STA 103 is monitoring the medium with CCA-omni, this CCA will be busy and will detect link-1 PPDUs. While it is receiving link-1, the STA 103 may be able to detect an RTS/CTS that would be transmitted from another STA 103 on link-2, in case it is received with a higher power than link-1. After checking if CCA-AWV is clear, the STA 103 may decrement and may monitor the channel with an omni receive antenna pattern. When CCA-omni is busy due to the same transmission as the previous RTS/CTS, the backoff may continue decreasing as CCA-AWV was tested clear. If the CCA-omni is busy due to other reasons, the STA 103 may either test the CCA-AWV again to see if the backoff can continue decrementing. Or if the CCA-AWV cannot be tested, the backoff may be frozen.

In some embodiments, during backoff decrement, the STA 103 may monitor the medium with the AWV that allowed backoff decrement (CCA-AWV idle). The STA 103 may then check CCA-AWV every timeslot and if backoff reaches zero, the STA 103 may transmit with this AWV.

Referring to FIG. 14, example operations and example flow are shown. Embodiments are not limited to the operations, ordering, arrangement and/or other aspects shown in FIG. 14 and are also not limited to the flow shown in FIG. 14. Some embodiments may not necessarily include all operations shown in FIG. 14. Some embodiments may include one or more additional operations not shown in FIG. 14. Some embodiments may include one or more operations shown in FIG. 14 and may also include one or more additional operations (including but not limited to one or more operations shown in any of FIGS. 1-17). Some embodiments may include one or more operations that are similar to, related to and/or reciprocal to one or more operations shown in FIG. 14.

At operation 1405, a CCA quasi-omni may be checked. If it is idle (as indicated by 1410), the STA 103 may decrement a backoff at operation 1411. If the backoff is zero (as indicated by 1412) the STA 103 may transmit at operation 1413. If the CCA quasi-omni is busy for data transmission during a TXOP for which a CCA-AWV was checked as clear (after operation 1405), the STA 103 may continue decrement of the backoff at operation 1421. If the backoff is zero (as indicated by 1422), the STA 103 may tranmit on the sector/AWV corresponding to the CCA-AWV that was idle. If the CCA quasi-omni is busy (as indicated by 1430), the STA 103 may freeze the backoff at operation 1431. The STA 103 may also, when receiving an RTS/CTS with appended TRN sequences, freeze the backoff and test CCA(s) on preferred sector/AWVs (as indicated by 1432). For a CCA-AWV that is busy or not tested (as indicated by 1433), the backoff may be frozen. For those that are idle (as indicated by 1435), the STA 103 may check if a TXOP indicated in the RTS/CTS is longer than a remaining backoff (at operation 1436). If no (as indicated by 1437), the STA 103 may keep the backoff frozen and may set the CCA-AWV to busy at operation 1438. If yes (as indicated by 1439), the STA 103 may perform operation 1405.

Figure 15:
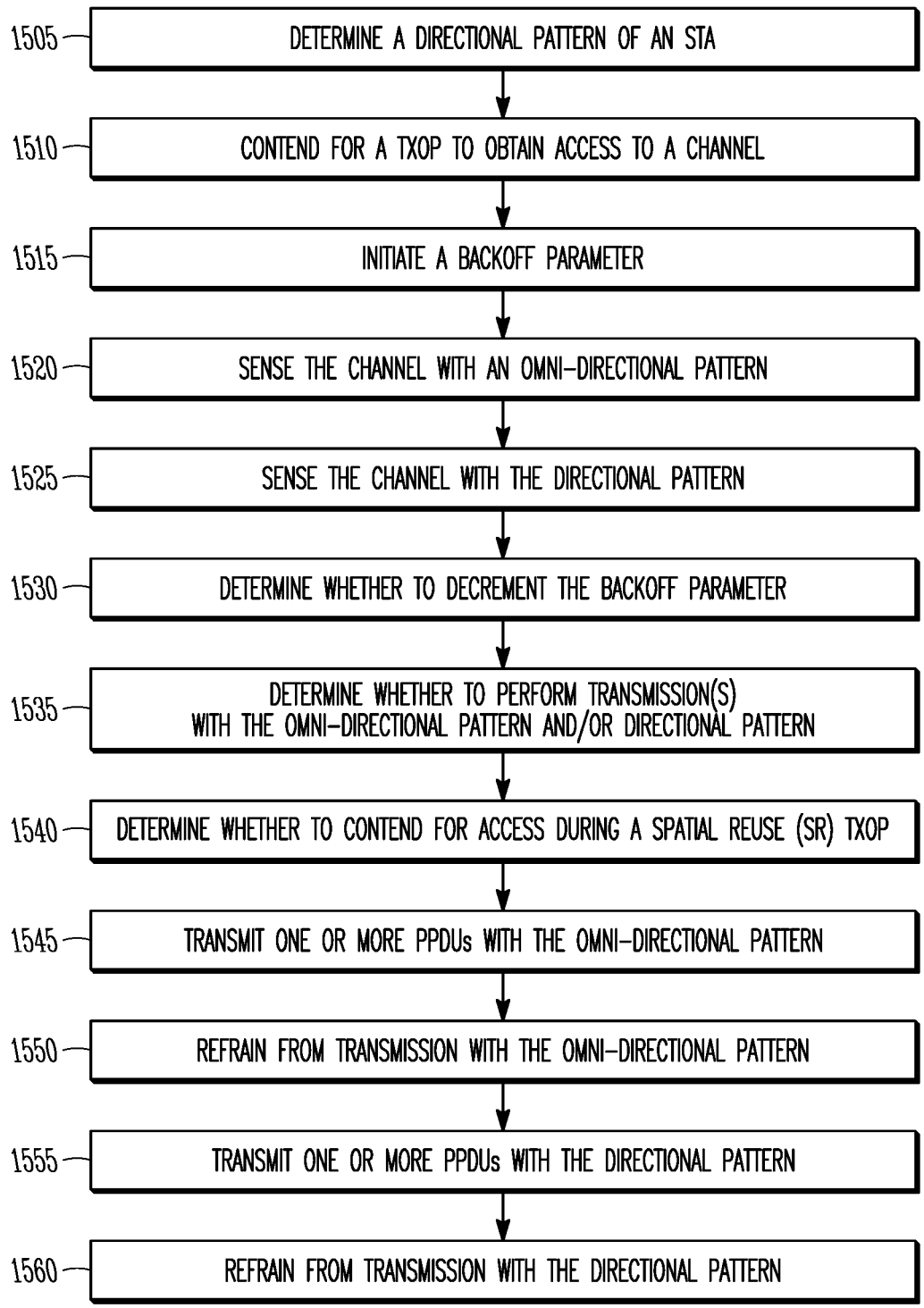
FIG. 15 illustrates the operation of another method of communication in accordance with some embodiments.

FIG. 15 illustrates the operation of another method of communication in accordance with some embodiments. As mentioned previously regarding the method 800, embodiments of the method 1500 may include additional or even fewer operations or processes in comparison to what is illustrated in FIG. 15 and embodiments of the method 1500 are not necessarily limited to the chronological order that is shown in FIG. 15. In describing the method 1500, reference may be made to FIGS. 1-14 and 16-17, although it is understood that the method 1500 may be practiced with any other suitable systems, interfaces and components.

In some embodiments, the STA 103 may be configurable to operate as an HE device 104. Although reference may be made to an STA 103 herein, including as part of the descriptions of the method 1500 and/or other methods described herein, it is understood that an HE device 104 and/or STA 103 configurable to operate as an HE device 104 may be used in some embodiments. In addition, embodiments of the method 1500 may be applicable to APs 102, STAs 103, UEs, eNBs or other wireless or mobile devices. The method 1500 may also be applicable to an apparatus for an AP 102, STA 103 and/or other device described above.

In some embodiments, one or more operations of the method 1500 may be the same as or similar to one or more operations described herein, including but not limited to one or more operations of the methods 800 and/or 1200. In addition, previous discussion of various techniques and concepts may be applicable to the method 1500 in some cases, including directional backoff parameter, directional pattern, directional EDCAF, omni-directional backoff parameter, omni-directional pattern, omni-directional EDCAF, spatial reuse, spatial multiplexing, concurrent transmission, channel contention, TXOP and/or others. In addition, one or more examples shown in any of FIGS. 1-17 may be applicable, in some cases, although the scope of embodiments is not limited in this respect.

At operation 1505, the STA 103 may determine a directional pattern of another STA 103. For instance, the STA 103 may intend to transmit data to the other STA 103. At operation 1510, the STA 103 may contend for a TXOP to obtain access to a channel. At operation 1515, the STA 103 may initiate a backoff parameter. It should be noted that a single backoff parameter may be used for contention based access for omni-directional transmission, directional transmission or a combination thereof, in some embodiments. Examples of such will be described below.

At operation 1520, the STA 103 may sense the channel with an omni-directional pattern. At operation 1525, the STA 103 may sense the channel with the directional pattern. At operation 1530, the STA 103 may determine whether to decrement the backoff parameter. At operation 1535, the STA 103 may determine whether to perform transmission(s)

with the omni-directional pattern and/or directional pattern. At operation 1540, the STA 103 may determine whether to contend for access during a spatial reuse (SR) TXOP. The SR TXOP may be a period within the TXOP, examples of which will be described below. At operation 1545, the STA 103 may transmit one or more PPDUs with the omni-directional pattern. At operation 1550, the STA 103 may refrain from transmission with the omni-directional pattern. At operation 1555, the STA 103 may transmit one or more PPDUs with the directional pattern. At operation 1560, the STA 103 may refrain from transmission with the directional pattern. One or more of operations 1515-1560 (and/or others in some cases) may be performed. Various example arrangements will be described in more detail below.

In some embodiments, the STA 103 may initiate and/or generate a backoff parameter for contention based access to a channel. The STA 103 may sense the channel with an omni-directional pattern. When channel inactivity is sensed with the omni-directional pattern, the STA 103 may decrement the backoff parameter and may determine whether to transmit on the channel based on the decremented backoff parameter. When channel activity is sensed with the omni-directional pattern, the STA 103 may perform one or more of the following. The STA 103 may decode a request-to-send (RTS) frame from an originating STA, the RTS frame included in a data transmission from the originating STA to a destination STA during a transmission opportunity (TXOP) obtained by the originating STA. The STA 103 may determine, based at least partly on durations of the TXOP and the data transmission included in the RTS frame, a spatial reuse TXOP (SR-TXOP) included within the TXOP after the data transmission. The STA 103 may contend for access to the channel during the SR-TXOP in accordance with a spatial reuse (SR) backoff parameter.

In some embodiments, as part of the contention for access to the channel during the SR-TXOP, the STA 103 may perform directional channel sensing during the SR-TXOP in one or more candidate transmit directions to determine a transmit direction for a directional transmission during the SR-TXOP. The STA 103 may further decrement the SR backoff parameter when channel inactivity is sensed in at least one of the candidate transmit directions in the directional channel sensing. The STA 103 may, when the decremented SR backoff parameter is greater than zero, refrain from transmission. The STA 103 may, when the decremented SR backoff parameter is zero, encode a physical layer convergence procedure protocol data unit (PPDU) for directional transmission in one of the transmit directions for which the channel inactivity is sensed in the directional channel sensing.

Figure 16:
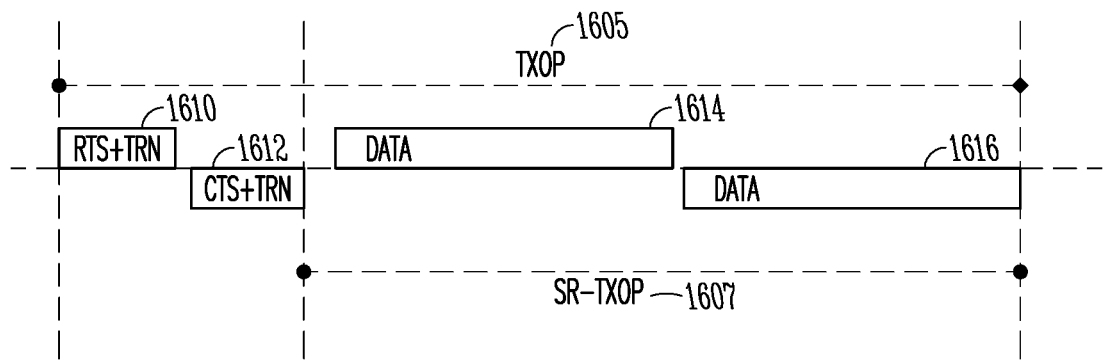
FIG. 16 illustrates example transmission opportunity (TXOP) arrangements in accordance with some embodiments.
Figure 16:
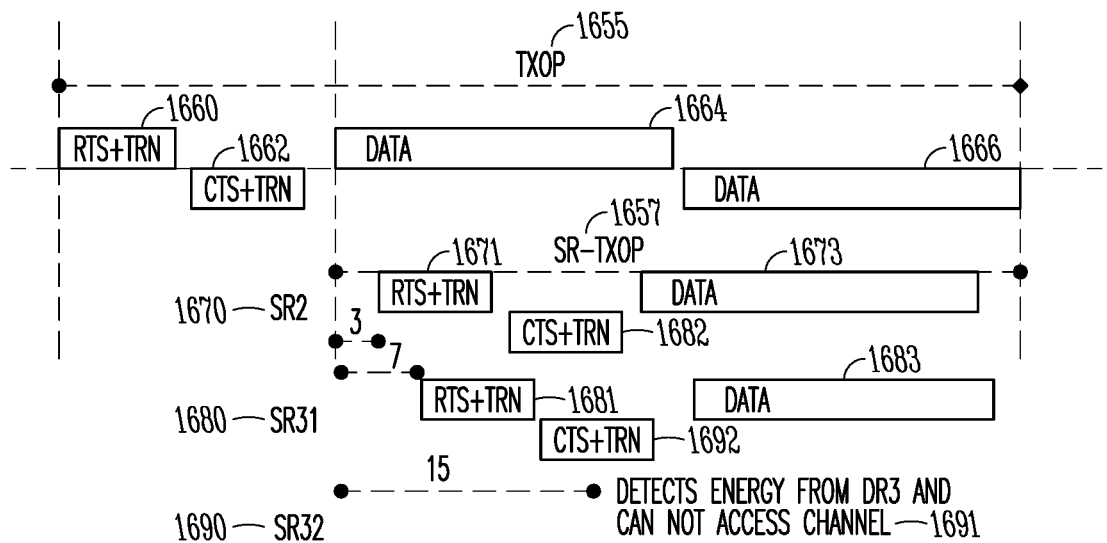

In some embodiments, each STA 103 may have a single EDCAF with a single backoff per AC. However, when RTS/CTS is transmitted with TRN fields at the beginning of a TxOP, a spatial reuse TxOP (SR-TxOP) may result and/or be created. In a non-limiting example, the SR-TXOP may start at a time after the RTS/CTS exchange and may end at the end of the TXOP. Examples for a start of the SR-TxOP include, but are not limited to: at the end of a CTS-timout after the end of RTS; at the end of SIFS after the end of CTS; at the end of CTS; after SIFS plus reuse-delay after the end of CTS. Example scenarios 1600 and 1650 are shown in FIG. 16. The SR-TXOP 1607 starts after the CTS (plus TRN) 1612 in the example 1600.

In some embodiments, STAs 103 that have checked with TRN in RTS and/or CTS whether they can reuse with one or multiple AWVs (CCA-AWV idle), while their CCA-omni was busy may contend to access the channel during this SR-TxOP period. In the example scenario 1300 in FIG. 13, the STAs SR2 (1325), SR3-1 (1330), and SR3-2 (1340) may have their AWV idle and may content for channel access. They may be referred to as "SR-STAs" in the discussion that follows. In order to prevent potential collisions between SR-STAs, a specific SR-EDCAF with a specific backoff (per AC) can be generated. The parameters for these SR-EDCAF can be lower in order to enable less contention time, as there will be fewer STAs 103 contenting for the channel, and can be advertised by the AP 102 with the same mechanism (new field) as for regular EDCA parameters. This SR-EDCAF may be restricted to usage during the SR-TxOP, in some cases. The STA 103 may either generate a new backoff every SR-TxOP or may keep the backoff count as it was left from the previous SR-TxOP. During the contention period of the SR-TxOP, the SR-STAs may listen to the channel using the quasi-omni antenna (in order to detect possible other RTS/CTS sent by other SR-STAs), in some cases. In some cases, the SR-STAs may listen to the channel using the AWV that they can use during SR-TxOP. Referring to the example scenario 1650, if SR2 has a backoff of 3, SR3-1 has a backoff of 7, and SR3-2 has a backoff of 15.

Figure 17:
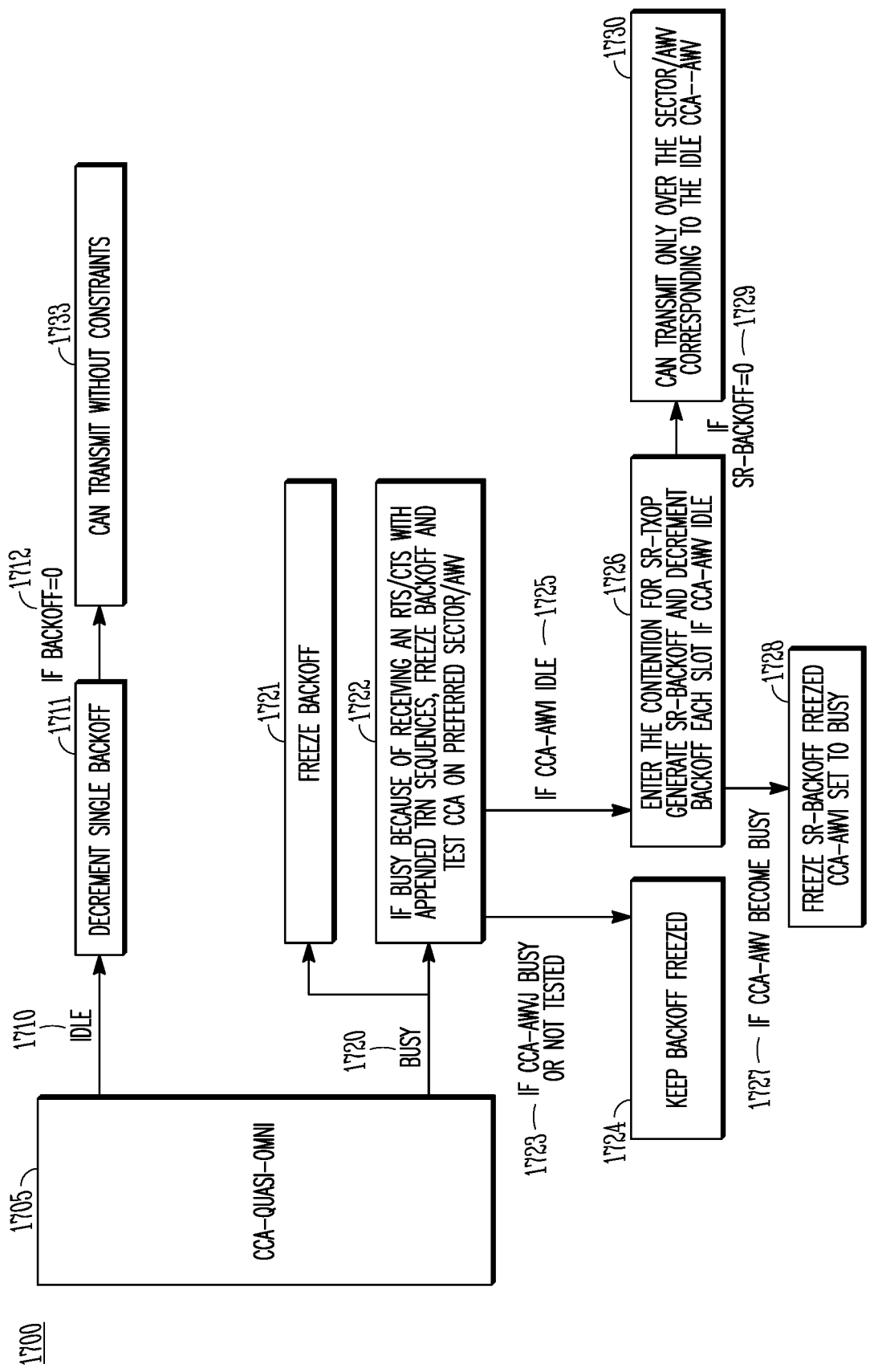
FIG. 17 illustrates additional example operations in accordance with some embodiments.

Referring to FIG. 17, example operations and example flow are shown. Embodiments are not limited to the operations, ordering, arrangement and/or other aspects shown in FIG. 17 and are also not limited to the flow shown in FIG. 17. Some embodiments may not necessarily include all operations shown in FIG. 17. Some embodiments may include one or more additional operations not shown in FIG. 17. Some embodiments may include one or more operations shown in FIG. 17 and may also include one or more additional operations (including but not limited to one or more operations shown in any of FIGS. 1-17). Some embodiments may include one or more operations that are similar to, related to and/or reciprocal to one or more operations shown in FIG. 17.

At operation 1705, a CCA quasi-omni may be checked. If it is idle (as indicated by 1710), the STA 103 may decrement a backoff at operation 1711. If the backoff is zero (as indicated by 1712) the STA 103 may transmit at operation 1713. If the CCA quasi-omni is busy (as indicated by 1720), the STA 103 may freeze the backoff at operation 1721. The STA 103 may also, if busy due to receiving an RTS/CTS with appended TRN sequences, freeze the backoff and test CCA(s) on preferred sector/AWVs (as indicated by 1722). For a CCA-AWV that is busy or not tested (as indicated by 1723), the backoff may be frozen at operation 1724. For those that are idle (as indicated by 1725), the STA 103 may enter a contention for the SR TXOP and may generate an SR backoff and may decrement the backoff each slot if CCA-AWV is idle. If the SR backoff is zero (as indicated by 1729), the STA 103 may transmit over the sector/AWV corresponding to the idle CCA-AWV at operation 1730. Otherwise, the STA 103 may freeze the SR backoff and set the CCA-AWV to zero at operation 1728.

It should be noted that some operations are described herein as part of transmission of data by the AP 102. That is, the AP 102 may perform operations such as sensing of the channel, contention for access to the channel, one or more transmissions (directional, omni-directional or a combination thereof) and/or other operations. Embodiments are not limited to performance of such operations by the AP 102, however, as the STA 103 may perform one or more such operations, in some embodiments. It should also be noted that some operations are described herein as part of transmission of data by the STA 103. That is, the STA 103 may perform operations such as sensing of the channel, contention for access to the channel, one or more transmissions (directional, omni-directional or a combination thereof) and/or other operations. Embodiments are not limited to performance of such operations by the STA 103, however, as the AP 102 may perform one or more such operations, in some embodiments.

It should be noted that some embodiments may include one or more operations from any of the methods 800, 1200, 1500; from any of FIGS. 11, 14, and/or 17; and/or from any descriptions herein. Some of those embodiments may also include one or more operations that are reciprocal to, related to and/or similar to such operations.

In Example 1, an apparatus of an access point (AP) may comprise memory. The apparatus may further comprise processing circuitry. The processing circuitry may be configured to contend for access to a channel. The contention may be performed in accordance with an omni-directional enhanced distributed channel access function (EDCAF) for transmission within an omni-directional pattern. The contention may be performed further in accordance with a directional EDCAF for transmission to a station (STA) in a directional pattern. The processing circuitry may be further configured to initiate an omni-directional backoff parameter for the omni-directional EDCAF. The processing circuitry may be further configured to initiate a directional backoff parameter for the directional EDCAF. The processing circuitry may be further configured to sense the channel with the omni-directional pattern and with the directional pattern to determine whether to decrement the omni-directional backoff parameter and the directional backoff parameter. The processing circuitry may be further configured to determine whether to transmit within the omni-directional pattern based at least partly on the omni-directional backoff parameter. The processing circuitry may be further configured to determine whether to transmit in the directional pattern based at least partly on the directional backoff parameter.

In Example 2, the subject matter of Example 1, wherein the processing circuitry may be further configured to contend for access to the channel for concurrent transmission within the omni-directional pattern and in the directional pattern.

In Example 3, the subject matter of one or any combination of Examples 1-2, wherein the processing circuitry may be further configured to, during a sensing period, sense the channel with the omni-directional pattern. The processing circuitry may be further configured to, during the sensing period, when channel inactivity is sensed with the omni-directional pattern: decrement the omni-directional backoff parameter and decrement the directional backoff parameter. The processing circuitry may be further configured to, during the sensing period, when channel activity is sensed with the omni-directional pattern: refrain from decrement of the omni-directional backoff parameter; sense the channel with the directional pattern; decrement the directional backoff parameter when channel inactivity is sensed with the directional pattern. The processing circuitry may be further configured to refrain from decrement of the directional backoff parameter when channel activity is sensed with the directional pattern.

In Example 4, the subject matter of one or any combination of Examples 1-3, wherein the processing circuitry may be further configured to, if the directional backoff parameter is decremented to zero during the sensing period: encode a physical layer converge procedure (PLCP) protocol data unit (PPDU) for transmission in the directional pattern during a transmission opportunity (TXOP). The TXOP may include a time window subsequent to the sensing period. The TXOP may be accessible to the AP for transmission based at least partly on the decrement of the directional backoff parameter to zero during the sensing period.

In Example 5, the subject matter of one or any combination of Examples 1-4, wherein the STA is a first STA. The processing circuitry may be further configured to, if the omni-directional backoff parameter is decremented to zero during the sensing period: encode another PPDU for transmission to a second STA within the omni-directional pattern during the TXOP.

In Example 6, the subject matter of one or any combination of Examples 1-5, wherein the processing circuitry may be further configured to, if the omni-directional backoff parameter is not decremented to zero during the sensing period: restrict transmission in at least a portion of the omni-directional pattern that is exclusive to the directional pattern.

In Example 7, the subject matter of one or any combination of Examples 1-6, wherein the processing circuitry may be further configured to, if the directional backoff parameter is decremented to zero during the sensing period or if the omni-directional backoff parameter is decremented to zero during the sensing period: encode a physical layer converge procedure (PLCP) protocol data unit (PPDU) for transmission in the directional pattern.

In Example 8, the subject matter of one or any combination of Examples 1-7, wherein the processing circuitry may be further configured to detect a signal power as part of the channel sensing with the omni-directional pattern. The processing circuitry may be further configured to sense the channel inactivity or channel activity with the omni-directional pattern based at least partly on a comparison between the signal power and a predetermined threshold.

In Example 9, the subject matter of one or any combination of Examples 1-8, wherein the signal power is a first signal power, the predetermined threshold is a first predetermined threshold. The processing circuitry may be further configured to, when the channel activity is sensed with the omni-directional pattern: detect a second signal power as part of the channel sensing with the directional pattern; and sense the channel inactivity or channel activity with the directional pattern based at least partly on a comparison between the second signal power and a second predetermined threshold.

In Example 10, the subject matter of one or any combination of Examples 1-9, wherein the processing circuitry may be further configured to, as part of the channel sensing with the omni-directional pattern: attempt to detect a ready-to-send (RTS) frame or a clear-to-send (CTS) frame with the omni-directional pattern; and sense the channel inactivity or channel activity with the omni-directional pattern based at least partly on the attempted detection of the RTS frame or CTS frame with the omni-directional pattern. The processing circuitry may be further configured to, as part of the channel sensing with the directional pattern: attempt to detect an RTS frame or a CTS frame with the directional pattern; and sense the channel inactivity or channel activity with the directional pattern based at least partly on the attempted detection of the RTS frame or CTS frame with the directional pattern.

In Example 11, the subject matter of one or any combination of Examples 1-10, wherein as part of the channel sensing with the omni-directional pattern, the attempted detection of the RTS frame or CTS frame with the omni-directional pattern may include attempted detection with the omni-directional pattern of one or more receiver training (R-TRN) fields of the RTS frame or CTS frame. As part of the channel sensing with the directional pattern, the attempted detection of the RTS frame or CTS frame with the directional pattern may include attempted detection with the directional pattern of one or more R-TRN fields of the RTS frame or CTS frame.

In Example 12, the subject matter of one or any combination of Examples 1-11, wherein the processing circuitry may be further configured to determine an antenna weight vector (AWV) of the STA based at least partly on a beamforming training in accordance with the omni-directional pattern. The transmission with the directional pattern may be performed using the AWV of the STA.

In Example 13, the subject matter of one or any combination of Examples 1-12, wherein the apparatus may comprise an omni-directional antenna or may be coupled to an omni-directional antenna for the transmission within the omni-directional pattern. The apparatus may further comprise a directional antenna or may be coupled to a directional antenna for the transmission in the directional pattern. The AWV may be determined for usage by the directional antenna.

In Example 14, the subject matter of one or any combination of Examples 1-13, wherein the memory may be configurable to store the AWV of the STA.

In Example 15, the subject matter of one or any combination of Examples 1-14, wherein the AP may be arranged to operate in accordance with a wireless local area network (WLAN) protocol.

In Example 16, the subject matter of one or any combination of Examples 1-15, wherein the processing circuitry may include a baseband processor to initiate the omni-directional backoff parameter and the directional backoff parameter.

In Example 17, the subject matter of one or any combination of Examples 1-16, wherein the processing circuitry may be further configured to sense the channel with the omni-directional pattern based on a signal received in accordance with the omni-directional pattern. The apparatus may further include a transceiver to receive the signal.

In Example 18, a non-transitory computer-readable storage medium may store instructions for execution by one or more processors to perform operations for contention based access by an access point (AP). The operations may configure the one or more processors to determine whether channel activity is present during a sensing period based on channel sensing with an omni-directional pattern. The operations may further configure the one or more processors to, when channel activity is determined as absent during the sensing period: decrement an omni-directional backoff parameter for an omni-directional contention and decrement one or more directional backoff parameters for one or more directional contentions for one or more candidate transmit directions. The operations may further configure the one or more processors to, when channel activity is determined as present during the sensing period: refrain from decrement of the omni-directional backoff parameter; and determine whether to decrement the directional backoff parameters based on directional channel sensing in the candidate transmit directions. The operations may further configure the one or more processors to determine that access to the channel for a transmission opportunity (TXOP) has been obtained by the AP when the omni-directional backoff parameter or at least one of the directional backoff parameters is decremented to zero during the sensing period.

In Example 19, the subject matter of Example 18, wherein the operations may further configure the one or more processors to decrement the directional backoff parameters for which directional channel inactivity is determined as part of the directional channel sensing. The operations may further configure the one or more processors to refrain from decrement of the directional backoff parameters for which directional channel activity is determined as part of the directional channel sensing.

In Example 20, the subject matter of one or any combination of Examples 18-19, wherein when the omni-directional backoff parameter is decremented to zero during the sensing period, access to the channel for the TXOP may be obtained by the AP for omni-directional transmission or for directional transmission in any of the candidate transmit directions. When at least one of the directional backoff parameters is decremented to zero during the sensing period, access to the channel for the TXOP may be obtained by the AP for one or more directional transmissions in the candidate transmit directions for which the directional backoff parameters are decremented to zero during the sensing period.

In Example 21, an apparatus of a station (STA) may comprise memory. The apparatus may further comprise processing circuitry. The processing circuitry may be configured to generate a backoff parameter for contention based access to a channel. The processing circuitry may be further configured to sense the channel with an omni-directional pattern. The processing circuitry may be further configured to, when channel inactivity is sensed with the omni-directional pattern, decrement the backoff parameter and determine whether to transmit on the channel based on the decremented backoff parameter. The processing circuitry may be further configured to, when channel activity is sensed with the omni-directional pattern: decode a request-to-send (RTS) frame from an originating STA, the RTS frame included in a data transmission from the originating STA to a destination STA during a transmission opportunity (TXOP) obtained by the originating STA; determine, based at least partly on durations of the TXOP and the data transmission included in the RTS frame, a remainder time of the TXOP after the data transmission; and when the remainder time of the TXOP is greater than a threshold, perform directional channel sensing in one or more candidate transmit directions to determine a transmit direction for a directional transmission by the STA during the TXOP, the directional channel sensing based on directional reception of receive training (R-TRN) fields included in the RTS frame.

In Example 22, the subject matter of Example 21, wherein the threshold may be based at least partly on the backoff parameter.

In Example 23, the subject matter of one or any combination of Examples 21-22, wherein the processing circuitry may be further configured to, when the remainder time of the TXOP is greater than a threshold and when channel inactivity is determined as part of the directional channel sensing for a sub-group of one or more of the candidate transmit directions: decrement the backoff parameter; when the decremented backoff parameter is zero, encode one or more physical layer converge procedure (PLCP) protocol data units (PPDUs) for directional transmission in at least one of the directions of the sub-group during the TXOP after the data transmission of the originating STA; and when the decremented backoff parameter is greater than zero, perform additional omni-directional channel sensing and additional directional channel sensing in the candidate transmit directions of the sub-group to determine whether to perform directional transmissions in the transmit directions of the sub-group. The processing circuitry may be further configured to, when the remainder time of the TXOP is greater than a threshold and when channel activity is determined for the candidate transmit directions as part of the directional channel sensing, refrain from decrement of the backoff parameter.

In Example 24, the subject matter of one or any combination of Examples 21-23, wherein the processing circuitry may be further configured to, when the channel inactivity is sensed with the omni-directional pattern and when the decremented backoff parameter is zero, determine that the STA is to transmit in at least one of the candidate transmit directions. The processing circuitry may be further configured to, when the decremented backoff parameter is greater than zero, determine that the STA is to refrain from transmission.

In Example 25, a method of contention-based access may comprise generating a backoff parameter for contention based access to a channel. The method may further comprise sensing the channel with an omni-directional pattern. The method may further comprise, when channel inactivity is sensed with the omni-directional pattern, decrementing the backoff parameter and determining whether to transmit on the channel based on the decremented backoff parameter. The method may further comprise, when channel activity is sensed with the omni-directional pattern: decoding a request-to-send (RTS) frame from an originating STA, the RTS frame included in a data transmission from the originating STA to a destination STA during a transmission opportunity (TXOP) obtained by the originating STA; determining, based at least partly on durations of the TXOP and the data transmission included in the RTS frame, a spatial reuse TXOP (SR-TXOP) included within the TXOP after the data transmission; and contending for access to the channel during the SR-TXOP in accordance with a spatial reuse (SR) backoff parameter.

In Example 26, the subject matter of Example 25, wherein the contending for access to the channel during the SR-TXOP may comprise: performing directional channel sensing during the SR-TXOP in one or more candidate transmit directions to determine a transmit direction for a directional transmission during the SR-TXOP; decrementing the SR backoff parameter when channel inactivity is sensed in at least one of the candidate transmit directions in the directional channel sensing; when the decremented SR backoff parameter is greater than zero, refraining from transmission; and when the decremented SR backoff parameter is zero, encoding a physical layer convergence procedure protocol data unit (PPDU) for directional transmission in one of the transmit directions for which the channel inactivity is sensed in the directional channel sensing.

In Example 27, an apparatus of an access point (AP) may comprise means for determining whether channel activity is present during a sensing period based on channel sensing with an omni-directional pattern. The apparatus may further comprise means for, when channel activity is determined as absent during the sensing period: decrementing an omni-directional backoff parameter for an omni-directional contention and decrement one or more directional backoff parameters for one or more directional contentions for one or more candidate transmit directions. The apparatus may further comprise means for, when channel activity is determined as present during the sensing period: refraining from decrement of the omni-directional backoff parameter; and determining whether to decrement the directional backoff parameters based on directional channel sensing in the candidate transmit directions. The apparatus may further comprise means for determining that access to the channel for a transmission opportunity (TXOP) has been obtained by the AP when the omni-directional backoff parameter or at least one of the directional backoff parameters is decremented to zero during the sensing period.

In Example 28, the subject matter of Example 27, wherein the apparatus may further comprise means for decrementing the directional backoff parameters for which directional channel inactivity is determined as part of the directional channel sensing. The apparatus may further comprise means for refraining from decrement of the directional backoff parameters for which directional channel activity is determined as part of the directional channel sensing.

In Example 29, the subject matter of one or any combination of Examples 27-28, wherein when the omni-directional backoff parameter is decremented to zero during the sensing period, access to the channel for the TXOP may be obtained by the AP for omni-directional transmission or for directional transmission in any of the candidate transmit directions. When at least one of the directional backoff parameters is decremented to zero during the sensing period, access to the channel for the TXOP may be obtained by the AP for one or more directional transmissions in the candidate transmit directions for which the directional backoff parameters are decremented to zero during the sensing period.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising: memory; and processing circuitry, configured to:
    contend for access to a channel, the contention in accordance with an omni-directional enhanced distributed channel access function (EDCAF) for transmission within an omni-directional pattern, the contention further in accordance with a directional EDCAF for transmission to a station (STA) in a directional pattern;
    initiate an omni-directional backoff parameter for the omni-directional EDCAF;
    initiate a directional backoff parameter for the directional EDCAF;
    decrement both the omni-directional backoff parameter and the directional backoff parameter when channel inactivity is sensed with the omni-directional pattern;
    decrement the directional backoff parameter when channel inactivity is sensed with the directional pattern; and
    encode a physical layer converge procedure (PLCP) protocol data unit (PPDU) for transmission within the omni-directional pattern when the omni-directional backoff parameter is decremented to zero; and
    encode a PPDU for transmission in the directional pattern when the directional backoff parameter is decremented to zero.

2. The apparatus according to claim 1, the processing circuitry further configured to:
    during a sensing period:
    sense the channel with the omni-directional pattern;
    when channel inactivity is sensed with the omni-directional pattern, decrement both the omni-directional backoff parameter and the directional backoff parameter;

when channel activity is sensed with the omni-directional pattern:
refrain from decrementing the omni-directional backoff parameter;
sense the channel with the directional pattern;
decrement the directional backoff parameter when channel inactivity is sensed with the directional pattern; and
refrain from decrementing the directional backoff parameter when channel activity is sensed with the directional pattern.

3. The apparatus according to claim 2, the processing circuitry further configured to contend for access to the channel for concurrent transmission within the omni-directional pattern and in the directional pattern, wherein contention for transmission within the omni-directional pattern uses the omni-directional EDCAF and contention for transmission within the directional pattern uses the directional EDCAF.

4. The apparatus according to claim 2, the processing circuitry further configured to, if the directional backoff parameter is decremented to zero during the sensing period:
encode the PPDU for transmission in the directional pattern during a transmission opportunity (TXOP),
wherein the TXOP includes a time window subsequent to the sensing period,
wherein the TXOP is accessible to the AP for transmission based at least partly on the decrementing the directional backoff parameter to zero during the sensing period.

5. The apparatus according to claim 4, wherein:
the STA is a first STA,
the processing circuitry is further configured to, if the omni-directional backoff parameter is decremented to zero during the sensing period:
encode another PPDU for transmission to a second STA within the omni-directional pattern during the TXOP.

6. The apparatus according to claim 4, the processing circuitry further configured to, if the omni-directional backoff parameter is not decremented to zero during the sensing period:
restrict transmission in at least a portion of the omni-directional pattern that is exclusive to the directional pattern.

7. The apparatus according to claim 2, the processing circuitry further configured to, if the directional backoff parameter is decremented to zero during the sensing period or if the omni-directional backoff parameter is decremented to zero during the sensing period:
encode the PPDU for transmission in the directional pattern.

8. The apparatus according to claim 2, wherein the AP is arranged to operate in accordance with a wireless local area network (WLAN) protocol.

9. The apparatus according to claim 2, wherein the processing circuitry includes a baseband processor to initiate the omni-directional backoff parameter and the directional backoff parameter.

10. The apparatus according to claim 2, wherein:
the processing circuitry is further configured to sense the channel with the omni-directional pattern based on a signal received in accordance with the omni-directional pattern,
the apparatus further includes a transceiver to receive the signal.

11. A non-transitory computer-readable storage medium that stores instructions for execution by one or more processors to perform operations for contention based access by an access point (AP), the operations to configure the one or more processors to:
determine whether channel activity is present during a sensing period based on channel sensing with an omni-directional pattern;
when channel activity is determined as absent during the sensing period:
decrement an omni-directional backoff parameter for an omni-directional contention and decrement one or more directional backoff parameters for one or more directional contentions for one or more candidate transmit directions, the omni-directional backoff parameter associated with an omni-directional enhanced distributed channel access function (EDCAF) the one or more directional backoff parameters associated with one or more directional EDCAFs;
when channel activity is determined as present during the sensing period:
refrain from decrementing of the omni-directional backoff parameter; and
decrement one or more of the directional backoff parameters when channel inactivity is sensed based on directional channel sensing in the candidate transmit directions;
determine that access to the channel for a transmission opportunity (TXOP) has been obtained by the AP when the omni-directional backoff parameter or at least one of the directional backoff parameters is decremented to zero during the sensing period;
encode a physical layer converge procedure (PLCP) protocol data unit (PPDU) for transmission within the omni-directional pattern when the omni-directional backoff parameter is decremented to zero; and
encode a PPDU for transmission in one of the directional patterns when the directional backoff parameter associated with the one directional pattern is decremented to zero.

12. The non-transitory computer-readable storage medium according to claim 11, the operations to further configure the one or more processors to:
decrement the directional backoff parameters for which directional channel inactivity is determined as part of the directional channel sensing; and
refrain from decrementing the directional backoff parameters for which directional channel activity is determined as part of the directional channel sensing.

13. The non-transitory computer-readable storage medium according to claim 11, wherein:
when the omni-directional backoff parameter is decremented to zero during the sensing period, access to the channel for the TXOP is obtained by the AP for omni-directional transmission or for directional transmission in any of the candidate transmit directions, and
when at least one of the directional backoff parameters is decremented to zero during the sensing period, access to the channel for the TXOP is obtained by the AP for one or more directional transmissions in the candidate transmit directions for which the directional backoff parameters are decremented to zero during the sensing period.

* * * * *